US012669710B2

(12) United States Patent
Mullins et al.

(10) Patent No.: US 12,669,710 B2
(45) Date of Patent: *Jun. 30, 2026

(54) INTELLIGENT APPLICATION OF RESERVES TO TRANSACTIONS

(71) Applicant: Block, Inc., Oakland, CA (US)

(72) Inventors: Brian Mullins, San Francisco, CA (US); Jeana Williams, San Francisco, CA (US); Natalie Tarabay, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/416,628

(22) Filed: Jan. 18, 2024

(65) Prior Publication Data

US 2024/0160020 A1 May 16, 2024

Related U.S. Application Data

(63) Continuation of application No. 17/874,184, filed on Jul. 26, 2022, now Pat. No. 11,914,154, which is a
(Continued)

(51) Int. Cl.
G02B 27/01 (2006.01)
G06F 3/01 (2006.01)
(Continued)

(52) U.S. Cl.
CPC ....... G02B 27/0172 (2013.01); G02B 27/017 (2013.01); G06F 3/011 (2013.01);
(Continued)

(58) Field of Classification Search
CPC ... G02B 27/0172; G02B 27/017; G06F 3/011; G06F 3/012; G06F 3/0346; G06Q 20/085; G06Q 20/204; G06Q 40/08
(Continued)

(56) References Cited

U.S. PATENT DOCUMENTS 5,684,498 A    11/1997  Welch et al.
5,784,115 A     7/1998  Bozdagi
(Continued)

FOREIGN PATENT DOCUMENTS

AU    2018234921 A1    9/2018
AU    2021204725 B2    8/2022
(Continued)

OTHER PUBLICATIONS

"Report Information from Dialog", STIC, dated Apr. 4, 2022, 11 pages.
(Continued)

*Primary Examiner* — Hai Tran
(74) *Attorney, Agent, or Firm* — Lee & Hayes, P.C.

(57) ABSTRACT

Intelligent application of reserves to transactions is described. In an example, server(s) associated with a payment processing service receives first transaction data associated with a plurality of first transactions, wherein the first transaction data includes indications, for an individual first transaction, of whether a chargeback request occurred and item(s) and a customer associated with the transaction. In an example, the servers process the plurality of first transactions. A predictive model is trained based at least in part on the first transaction data. Second transaction data is received from a POS device of a second merchant associated with a second transaction. A value reflective of a level of risk for the second transaction is determined based on inputting an item or customer associated with the second transaction into the predictive model.

20 Claims, 6 Drawing Sheets

Related U.S. Application Data continuation of application No. 16/986,029, filed on Aug. 5, 2020, now Pat. No. 11,430,070, which is a continuation of application No. 15/665,355, filed on Jul. 31, 2017, now abandoned.

(51) Int. Cl.

| | |
|---|---|
| *G06F 3/0346* | (2013.01) |
| *G06Q 20/08* | (2012.01) |
| *G06Q 20/20* | (2012.01) |
| *G06Q 40/08* | (2012.01) |

(52) U.S. Cl.

CPC ............ *G06F 3/012* (2013.01); *G06F 3/0346* (2013.01); *G06Q 20/085* (2013.01); *G06Q 20/204* (2013.01); *G06Q 40/08* (2013.01); *G02B 2027/0125* (2013.01); *G02B 2027/0134* (2013.01); *G02B 2027/0138* (2013.01); *G02B 2027/014* (2013.01); *G02B 2027/0178* (2013.01); *G02B 2027/0181* (2013.01)

(58) Field of Classification Search

USPC ............................................................ 705/4

See application file for complete search history.

(56) References Cited

U.S. PATENT DOCUMENTS

| | | | |
|---|---|---|---|
| 5,844,530 A | 12/1998 | Tosaki | |
| 6,891,533 B1 | 5/2005 | Alcorn et al. | |
| 8,027,912 B1 * | 9/2011 | Thomas | G06Q 40/08 |
| | | | 705/30 |
| 8,446,426 B2 | 5/2013 | Gonion | |
| 8,950,867 B2 | 2/2015 | Macnamara | |
| 8,989,775 B2 | 3/2015 | Shaw | |
| 9,336,494 B1 | 5/2016 | Purpura et al. | |
| 9,639,935 B1 | 5/2017 | Douady-Pleven et al. | |
| 10,043,217 B1 | 8/2018 | Bolden et al. | |
| 10,130,429 B1 | 11/2018 | Weir | |
| 10,338,677 B2 | 7/2019 | Guenter | |
| 10,481,689 B1 | 11/2019 | Jeromin | |
| 10,721,280 B1 | 7/2020 | Heppner et al. | |
| 10,843,067 B1 | 11/2020 | Peuhkurinen et al. | |
| 10,942,252 B2 | 3/2021 | Chen et al. | |
| 10,964,119 B2 | 3/2021 | Nourai et al. | |
| 11,073,699 B2 | 7/2021 | Miller et al. | |
| 11,176,901 B1 | 11/2021 | Hunt et al. | |
| 11,315,214 B2 | 4/2022 | Liebenow et al. | |
| 11,430,070 B1 | 8/2022 | Mullins et al. | |
| 11,536,973 B2 | 12/2022 | Miller et al. | |
| 2002/0120559 A1 * | 8/2002 | O'Mara | G06Q 40/08 |
| | | | 705/38 |
| 2003/0052965 A1 | 3/2003 | Junkins et al. | |
| 2003/0187791 A1 * | 10/2003 | Weichert | G06Q 20/10 |
| | | | 705/40 |
| 2004/0039693 A1 * | 2/2004 | Nauman | G06Q 30/06 |
| | | | 705/39 |
| 2004/0078105 A1 | 4/2004 | Moon et al. | |
| 2007/0273644 A1 | 11/2007 | Mondine | |
| 2010/0103205 A1 | 4/2010 | Iisaka et al. | |
| 2010/0277476 A1 | 11/2010 | Johansson et al. | |
| 2011/0263329 A1 | 10/2011 | Miyazaki et al. | |
| 2012/0038549 A1 | 2/2012 | Mandella et al. | |
| 2012/0206452 A1 | 8/2012 | Geisner et al. | |
| 2013/0002614 A1 | 1/2013 | Nowatzyk et al. | |
| 2013/0083011 A1 | 4/2013 | Geisner et al. | |
| 2013/0253956 A1 | 9/2013 | Towne et al. | |
| 2013/0346142 A1 | 12/2013 | Young | |
| 2014/0080428 A1 | 3/2014 | Rhoads et al. | |
| 2014/0119598 A1 | 5/2014 | Ramachandran et al. | |
| 2014/0156568 A1 | 6/2014 | Ganguly et al. | |
| 2015/0029218 A1 | 1/2015 | Williams et al. | |
| 2015/0070347 A1 | 3/2015 | Hofmann et al. | |
| 2015/0234477 A1 | 8/2015 | Abovitz et al. | |
| 2015/0309264 A1 | 10/2015 | Abovitz et al. | |
| 2015/0309563 A1 | 10/2015 | Connor | |
| 2016/0016752 A1 | 1/2016 | Helseth et al. | |
| 2016/0021511 A1 | 1/2016 | Jin et al. | |
| 2016/0033768 A1 | 2/2016 | Pedrotti et al. | |
| 2016/0098095 A1 | 4/2016 | Gonzalez-Banos et al. | |
| 2016/0104311 A1 | 4/2016 | Allyn | |
| 2016/0117822 A1 | 4/2016 | Yii et al. | |
| 2016/0147065 A1 | 5/2016 | Border et al. | |
| 2016/0147070 A1 | 5/2016 | Border et al. | |
| 2016/0327789 A1 | 11/2016 | Klug et al. | |
| 2017/0098406 A1 | 4/2017 | Kobayashi | |
| 2017/0109748 A1 | 4/2017 | Kote | |
| 2017/0109916 A1 | 4/2017 | Kurz et al. | |
| 2017/0116674 A1 | 4/2017 | Howe et al. | |
| 2017/0126988 A1 | 5/2017 | Holzer et al. | |
| 2017/0148206 A1 | 5/2017 | Donner et al. | |
| 2017/0160798 A1 | 6/2017 | Lanman et al. | |
| 2017/0177082 A1 | 6/2017 | Michail et al. | |
| 2017/0213473 A1 | 7/2017 | Ribeira et al. | |
| 2017/0244811 A1 | 8/2017 | Mckenzie et al. | |
| 2017/0345220 A1 | 11/2017 | Bates | |
| 2017/0345398 A1 | 11/2017 | Fuchs et al. | |
| 2017/0359570 A1 | 12/2017 | Holzer et al. | |
| 2018/0053284 A1 | 2/2018 | Rodriguez et al. | |
| 2018/0054712 A1 | 2/2018 | Ahuja et al. | |
| 2018/0203235 A1 | 7/2018 | Fix et al. | |
| 2018/0267309 A1 | 9/2018 | Klug et al. | |
| 2018/0301076 A1 | 10/2018 | Trythall | |
| 2018/0315362 A1 | 11/2018 | Newton | |
| 2018/0365882 A1 | 12/2018 | Croxford et al. | |
| 2019/0064526 A1 | 2/2019 | Connor | |
| 2019/0066353 A1 | 2/2019 | Anderson et al. | |
| 2019/0066365 A1 | 2/2019 | Schmalstieg et al. | |
| 2019/0156504 A1 | 5/2019 | Jiang et al. | |
| 2019/0333263 A1 | 10/2019 | Melkote et al. | |
| 2019/0355176 A1 | 11/2019 | Evans | |
| 2020/0005517 A1 | 1/2020 | Anderson et al. | |
| 2020/0027194 A1 | 1/2020 | Nourai et al. | |
| 2020/0090152 A1 * | 3/2020 | Kumar | G06Q 20/10 |
| 2020/0184712 A1 | 6/2020 | Schmalstieg et al. | |
| 2020/0209978 A1 | 7/2020 | Pahud et al. | |
| 2022/0391989 A1 | 12/2022 | Mullins et al. | |

FOREIGN PATENT DOCUMENTS

| | | |
|---|---|---|
| AU | 2021290369 B2 | 10/2022 |
| CN | 103261944 A | 8/2013 |
| CN | 104866829 A | 8/2015 |
| JP | 2001-208529 A | 8/2001 |
| JP | 2007-128009 A | 5/2007 |
| JP | 2012-43308 A | 3/2012 |
| JP | 2012-96027 A | 5/2012 |
| JP | 2015-52832 A | 3/2015 |
| JP | 2016-528476 A | 9/2016 |
| KR | 10-2014-0034252 A | 3/2014 |
| KR | 10-2016-0013939 A | 2/2016 |
| KR | 10-2016-0023888 A | 3/2016 |
| WO | 94/04938 A1 | 3/1994 |
| WO | 2009/091563 A1 | 7/2009 |
| WO | 2015/048434 A1 | 4/2015 |
| WO | 2016/038240 A1 | 3/2016 |
| WO | 2018/026737 A1 | 2/2018 |
| WO | 2018/170482 A1 | 9/2018 |
| WO | 2020/023383 A1 | 1/2020 |

OTHER PUBLICATIONS

Chargeback Management Guidelines for Visa Merchants, dated Oct. 10, 2016, 93 pages.

Google NPL (non-patent literature) Search, dated Feb. 1, 2022, 3 pages.

Google Scholar Search Result, dated Nov. 11, 2021, 2 pages.

Google Scholar Search, dated Apr. 4, 2022, 2 pages.

Aryabrata et al., "Immersive 3DUI on one dollar a day", 3D User Interfaces (3DUI), 2012 IEEE Symposium On, Mar. 4, 2012, 4 pages.

(56) References Cited

OTHER PUBLICATIONS

Attal et al., "Physical Human Activity Recognition Using Wearable Sensors", Sensors, vol. 15, No. 12, Dec. 11, 2015, pp. 31314-31338.

Rolland et at, "The Past, Present, and Future of Head-mounted Display Designs", Proceedings Spie 7513, 2009 International Conference on Optical Instruments and Technology, vol. 5638, Nov. 8, 2004, pp. 368-377.

Chopra et al., "Learning a Similarity Metric Discriminatively, with Application to Face Verification", 2005 IEEE Computer Society Conference on Computer Vision and Pattern Recognition (CVPR'05), US, IEEE, Jun. 20, 2005, vol. 1, 8 pages.

Schroff et al., "FaceNet: A Unified Embedding for Face Recognition and Clustering", 2015 IEEE Conference on Computer Vision and Pattern Recognition (CVPR), US, IEEE, Jun. 17, 2015, 10 pages.

Theoharis et al., "The Magic of the Z-Buffer: A Survey", Journal of WSCG, Plzen, Czech Republic, Feb. 5, 2001, 8 pages.

Behzadan et al., "Scalable Algorithm for Resolving Incorrect Occlusion in Dynamic Augmented Reality Engineering Environments: Scalable algorithm for resolving incorrect occlusion", Computer-Aided Civil and Infrastructure Engineering, vol. 25, Jan. 1, 2010, pp. 3-19.

Breen et at., "Interactive Occlusion and automatic object placement for augmented reality", Computer Graphics Forum, Wileyblackwell Publishing Ltd, GB, vol. 15, No. 3, Aug. 26, 1996, 12 pages.

Mark et al., "Post-Rendering 3D Warping", Proceedings of 1997 Symposium on Interactive 3D Graphics, Providence, RI, New York, USA, Apr. 27-30, 1997, pp. 7-16.

Stewart et al., "An improved Z-Buffer CSG Rendering Algorithm", Proceedings of the Eurographics / Siggraph Workshop on Graphics Hardware, Lisbon, Aug. 31-Sep. 1, 1998; pp. 25-30.

Wolberg et al., "Separable image warping with spatial lookup tables", Computer Graphics, vol. 23, No. 3, Jul. 1989, pp. 369-378.

Foley et al., "The z-buffer algorithm", In: "Computer Graphics—Principles and Practice", Addison-Wesley Publishing Company, Jan. 1, 1990, pp. 668-672.

* cited by examiner

300
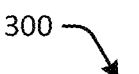

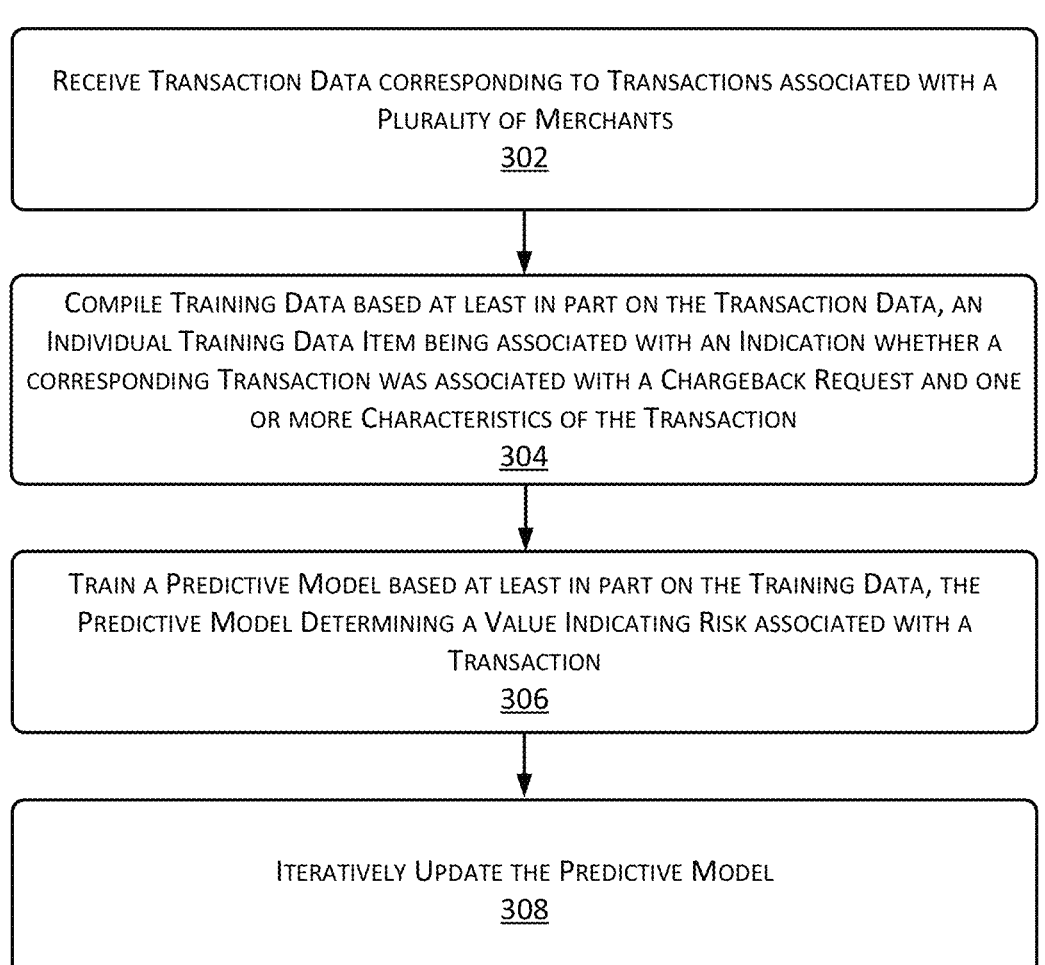

RECEIVE TRANSACTION DATA CORRESPONDING TO TRANSACTIONS ASSOCIATED WITH A PLURALITY OF MERCHANTS
302

COMPILE TRAINING DATA BASED AT LEAST IN PART ON THE TRANSACTION DATA, AN INDIVIDUAL TRAINING DATA ITEM BEING ASSOCIATED WITH AN INDICATION WHETHER A CORRESPONDING TRANSACTION WAS ASSOCIATED WITH A CHARGEBACK REQUEST AND ONE OR MORE CHARACTERISTICS OF THE TRANSACTION
304

TRAIN A PREDICTIVE MODEL BASED AT LEAST IN PART ON THE TRAINING DATA, THE PREDICTIVE MODEL DETERMINING A VALUE INDICATING RISK ASSOCIATED WITH A TRANSACTION
306

ITERATIVELY UPDATE THE PREDICTIVE MODEL
308

FIG. 3

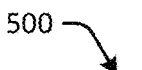
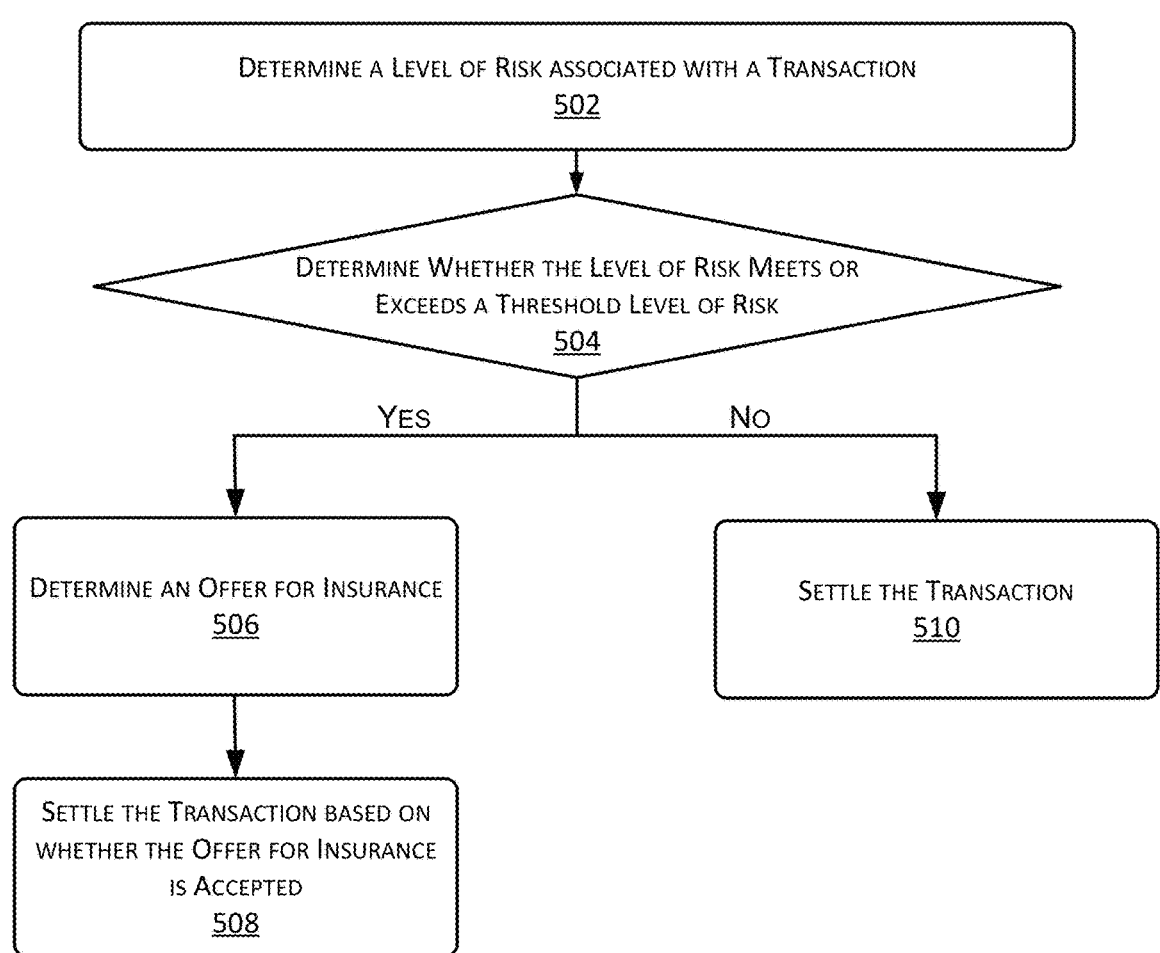
FIG. 5

600 ⌐

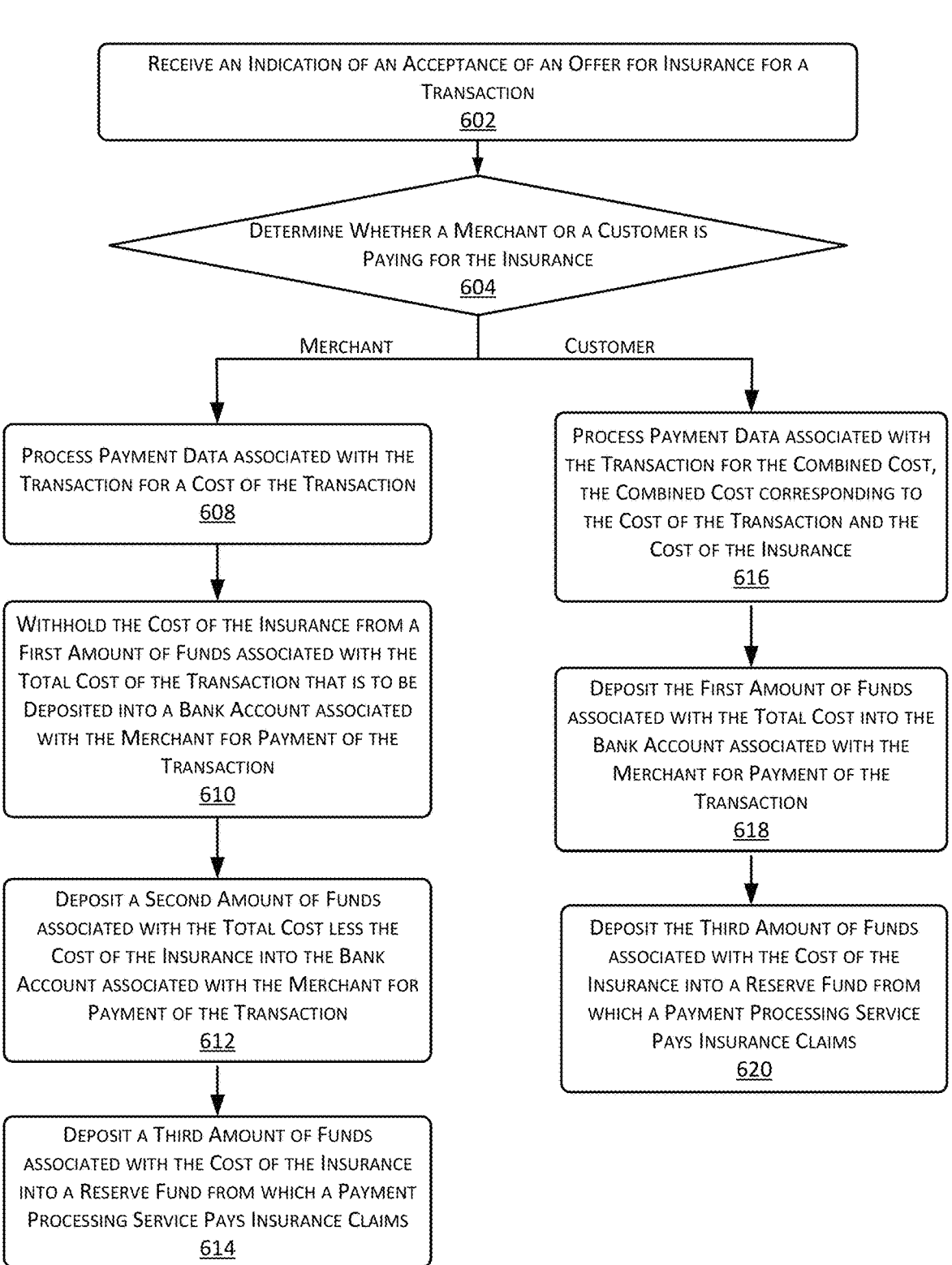

RECEIVE AN INDICATION OF AN ACCEPTANCE OF AN OFFER FOR INSURANCE FOR A TRANSACTION
602

DETERMINE WHETHER A MERCHANT OR A CUSTOMER IS PAYING FOR THE INSURANCE
604

MERCHANT                                    CUSTOMER

PROCESS PAYMENT DATA ASSOCIATED WITH THE TRANSACTION FOR A COST OF THE TRANSACTION
608

WITHHOLD THE COST OF THE INSURANCE FROM A FIRST AMOUNT OF FUNDS ASSOCIATED WITH THE TOTAL COST OF THE TRANSACTION THAT IS TO BE DEPOSITED INTO A BANK ACCOUNT ASSOCIATED WITH THE MERCHANT FOR PAYMENT OF THE TRANSACTION
610

DEPOSIT A SECOND AMOUNT OF FUNDS ASSOCIATED WITH THE TOTAL COST LESS THE COST OF THE INSURANCE INTO THE BANK ACCOUNT ASSOCIATED WITH THE MERCHANT FOR PAYMENT OF THE TRANSACTION
612

DEPOSIT A THIRD AMOUNT OF FUNDS ASSOCIATED WITH THE COST OF THE INSURANCE INTO A RESERVE FUND FROM WHICH A PAYMENT PROCESSING SERVICE PAYS INSURANCE CLAIMS
614

PROCESS PAYMENT DATA ASSOCIATED WITH THE TRANSACTION FOR THE COMBINED COST, THE COMBINED COST CORRESPONDING TO THE COST OF THE TRANSACTION AND THE COST OF THE INSURANCE
616

DEPOSIT THE FIRST AMOUNT OF FUNDS ASSOCIATED WITH THE TOTAL COST INTO THE BANK ACCOUNT ASSOCIATED WITH THE MERCHANT FOR PAYMENT OF THE TRANSACTION
618

DEPOSIT THE THIRD AMOUNT OF FUNDS ASSOCIATED WITH THE COST OF THE INSURANCE INTO A RESERVE FUND FROM WHICH A PAYMENT PROCESSING SERVICE PAYS INSURANCE CLAIMS
620

FIG. 6

INTELLIGENT APPLICATION OF RESERVES TO TRANSACTIONS

RELATED APPLICATIONS

This application claims priority to and is a continuation of U.S. patent application Ser. No. 17/874,184, filed on Jul. 26, 2022, which is a continuation of and claims priority to U.S. patent application Ser. No. 16/986,029, filed on Aug. 5, 2020, and granted as U.S. Pat. No. 11,430,070 on Aug. 30, 2022, which is a continuation of and claims priority to U.S. patent application Ser. No. 15/665,355, filed on Jul. 31, 2017, the entire contents of which are incorporated herein by reference.

BACKGROUND

A merchant may utilize the services of an online payment processing service for conducting purchase transactions with customers and for processing payments by customers. The payment processing service may provide services for a large number of merchants, and may include pricing services, inventory services, payroll services, and other integrated services.

In some situations, merchants or other parties may submit transactions to the payment processing service, for which the payment processing service may eventually become liable by a mechanism known as chargeback request. For instance, the payment processing service may become liable for a fraudulent transaction, a disputed transaction, etc. In such situations, the customer may complain to an issuing bank of a payment instrument of the customer about a transaction associated with the payment instrument. The issuing bank may reverse the charge as a form of customer protection. Accordingly, the issuing bank may charge the amount of the reversal to the payment processing service and the payment processing service may charge the amount of the reversal to the merchant. In some situations, the merchant is unable to pay the payment processing service.

BRIEF DESCRIPTION OF THE DRAWINGS

The above and other features of the present disclosure, its nature and various advantages, will be more apparent upon consideration of the following detailed description, taken in conjunction with the accompanying drawings in which:

FIG. 3 depicts a non-limiting flow diagram illustrating a process for training predictive model(s) in accordance with some examples of the present disclosure;

FIG. 5 depicts a non-limiting flow diagram illustrating a process for determining an offer for insuring a transaction based on a determined level of risk of the transaction and processing the transaction based on acceptance of the offer for insurance in accordance with some examples of the present disclosure; and FIG. 6 depicts a non-limiting flow diagram illustrating a process for settling a transaction in accordance with some examples of the present disclosure.

Figure 1:
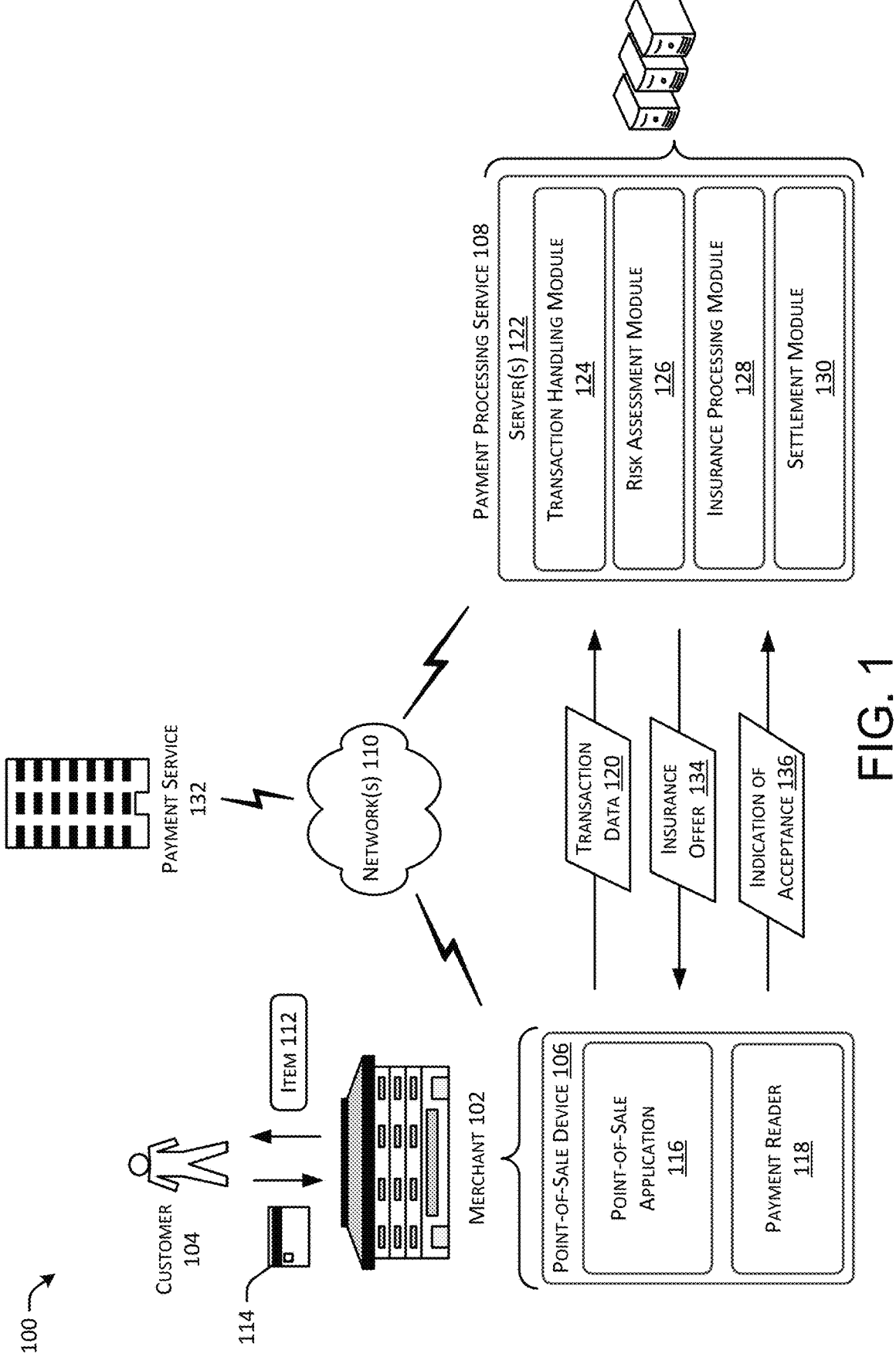
FIG. 1 depicts an illustrative block diagram of a system associated with transaction-level insurance provisioning in accordance with some examples of the present disclosure.

In the figures, the left-most digit(s) of a reference number identifies the figure in which the reference number first appears. The use of the same reference numbers in different figures indicates similar or identical items or features. Moreover, multiple instances of the same part are designated by a common prefix separated from the instance number by a dash. The drawings are not to scale.

DETAILED DESCRIPTION

A payment processing service may process payments between merchant(s) and customer(s). In at least one example, a payment processing service may offer point-of-sale (POS) systems which are associated with various applications of the payment processing service that ease POS interactions with customers. A POS system may include a POS terminal and a payment reader. The payment reader may physically interact with payment instruments such as magnetic stripe payment cards, EMV payment cards, and short-range communication (e.g., near field communication (NFC), radio frequency identification (RFID), Bluetooth®, Bluetooth® low energy (BLE), etc.) payment instruments. The POS terminal may provide a rich user interface, communicate with the payment reader, and also communicate with a server associated with the payment processing service. In this manner, the POS terminal and payment reader may collectively process transaction(s) between a merchant and customer(s) via the payment processing service. Additionally, in some examples, the payment processing service may process transaction(s) associated with POS interactions between customer(s) and a website of the merchant that is associated with various applications of the payment processing service.

Techniques described herein are directed to determining, based on a transaction-level risk assessment, when to provision insurance to merchants (or customers) to mitigate losses caused by chargeback requests. As described above, in some situations, merchants or other parties may submit transactions to the payment processing service, for which the payment processing service may eventually become liable by a mechanism known as a chargeback request. For instance, the payment processing service may become liable for a fraudulent transaction, a disputed transaction, etc. In such situations, a customer may complain to an issuing bank of a payment instrument of the customer about a transaction associated with the payment instrument. The issuing bank may reverse the charge as a form of customer protection. Accordingly, the issuing bank may charge the amount of the reversal to the payment processing service and the payment processing service may charge the amount of the reversal to the merchant. In some examples, the payment processing service may incur fees associated with a chargeback. In additional and/or alternative examples, the payment processing service may not be able to recover from the merchant, and may ultimately lose money based on a chargeback request.

Techniques described herein are directed to leveraging machine-learning techniques to construct predictive models that may be used to analyze data to make predictions regarding risk associated with transactions. Based at least in part on determining a level of risk associated with a transaction exceeds a threshold level of risk, a payment processing service may send an offer for insurance to a POS device handling the transaction. In some examples, a merchant associated with the transaction may opt to purchase the insurance. In other examples, a customer associated with the transaction may opt to purchase the insurance. In both examples, the POS device may communicate an acceptance of the offer for insurance to the payment processing service. Based on determining that insurance has been purchased for a transaction, the payment processing service may process the transaction differently than if the insurance had not been purchased. For instance, in at least one example, the payment processing service may deposit funds for payment of the transaction into a bank account associated with the merchant with less delay than if the insurance had not been purchased. Or, in an additional and/or alternative example, the payment processing service may decrease the amount of funds withheld from an initial deposit of funds for payment of the transaction into a bank account associated with the merchant as a result of the insurance being purchased. In some examples, the payment processing service may adjust processing fees charged by the payment processing service and/or otherwise modify standard terms of processing payments on behalf of the merchant. That is, based on determining that insurance is purchased for a transaction, the payment processing service may determine that a transaction is less risky (e.g., the payment processing service is less likely to incur a loss should a chargeback request be submitted), and may provide more favorable settlement terms to the merchant.

Techniques described herein are directed to leveraging funds collected from sales of insurance to mitigate loss resulting from chargeback requests and/or pay insurance claims. That is, in at least one example, the payment processing service may transfer an amount of funds corresponding to a cost of insurance for a particular transaction into a reserve fund. The reserve fund may be used to pay fees associated with chargeback requests and/or compensate the payment processing service for losses caused by the inability to recover the cost of a chargeback from a merchant. In some examples, the payment processing service may pay other insurance claims using the reserve fund. That is, in some examples, the offer for insurance may be for insurance services provided by the payment processing service. In additional and/or alternative examples, the payment processing service may partner with a third-party insurance provider and may refrain from keeping any of the funds (and instead pass the funds directly to the third-party insurance provider). That is, in such examples, the offer for insurance may be for insurance services provided by a third-party insurance provider.

As described above, techniques described herein are directed to leveraging predictive models to assess risk associated with transactions and make determinations with respect to provisioning insurance to cover potential losses associated with the transactions in near real-time. As described herein, techniques described may dynamically change one or more terms of offers for insurance based at least in part on assessed levels of risk and/or transaction data associated with a particular transaction. Accordingly, techniques described herein are directed to utilizing predictive models and/or dynamic settlement options to manage chargeback losses on a transaction-by-transaction basis. As a result, techniques described herein offer improvements over prior techniques for risk assessment and provisioning of insurance to mitigate risk. Accordingly, techniques described herein are useful to enable the payment processing service to mitigate risk. By identifying transactions that are likely to be associated with chargeback requests, for which the payment processing service may ultimately be liable, the payment processing service may choose whether to offer insurance for such transactions and process the transactions based on whether insurance was ultimately procured. That is, techniques described herein leverage intelligently provisioning insurance for transactions to enable increased security and reduced risk.

Furthermore, techniques described herein are directed to various improvements in computing technologies. For instance, by provisioning insurance to mitigate risk associated with chargeback requests, techniques described herein are directed to reducing the number of network calls and/or requests associated with such chargebacks. Additionally, techniques described herein reduce network traffic and improve database resources due to intelligently offering insurance on a transaction-by-transaction basis. For instance, by alleviating the need to withhold and store a portion of funds until some time after a transaction (to mitigate risk that the payment processing service is exposed to) and/or decreasing the amount of funds that are withheld and stored, techniques described herein reduce network traffic and improve database resources.

FIG. 1 depicts an illustrative block diagram of a system 100 associated with transaction-level insurance provisioning as described herein For purposes of discussion, FIG. 1 shows merchant 102 and customer 104. Merchant 102 has an associated point-of-sale (POS) device 106 that is supported by payment processing service 108. POS device 106 communicates with payment processing service 108 through network(s) 110. Payment processing service 108 processes transactions on behalf of merchant 102, as described above. In practice, payment processing service 108 may process transactions on behalf of multiple merchants.

Merchant 102 and customer 104 may interact with each other to complete a transaction in which customer 104 acquires item 112 from merchant 102, and in return, customer 104 provides payment to merchant 102. The term "transaction" includes any interaction for the acquisition of an item in exchange for payment. The term "item" may include goods and/or services. The term "customer" includes any entity that acquires items from a merchant, such as by purchasing, renting, leasing, borrowing, licensing, or the like. The term "merchant" includes any business engaged in the offering of items for acquisition by customers. Actions attributed to a merchant may include actions performed by owners, employees, or other agents of the merchant via a corresponding POS device (e.g., POS device 106).

Customer 104 may provide payment to merchant 102 using cash or another payment instrument 114. Payment instruments (e.g., payment instrument 114) may include, but are not limited to, magnetic stripe payment cards, EMV payment cards, and short-range communication (e.g., NFC, RFID, Bluetooth®, BLE, etc.) payment instruments, etc. In some examples, payment instrument 114 may be a stored-value card or gift card, a check, etc.

Merchant 102 may interact with POS device 106, as described above. In some types of businesses, POS device 106 may be located in a store or other place of business of merchant 102, and thus may be at a fixed location that does not change on a day-to-day basis. In other types of businesses, however, the location of POS device 106 may change from time to time, such as in the case that a merchant operates a food truck, is a street vendor, is a cab driver, etc., or has an otherwise mobile business, e.g., in the case of merchants who sell items at buyer's homes, places of business, and so forth.

When customer 104 and merchant 102 enter into a transaction, merchant 102 interacts with POS device 106 to provide payment information and to identify item(s) that are being purchased. The POS device may include POS application 116 and payment reader 118. Payment reader 118 may receive payment data associated with payment instrument 114 via an interaction between payment reader 118 and payment instrument 114. Payment data may include a name of customer 104, an address of customer 104, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to customer 104 (which may or may not match the number associated with the payment instrument), restrictions on what types of charges/debts may be made, etc. In some examples, payment instrument 114 may include one or more magnetic strips and/or other mechanisms (e.g., built-in memory chips, RIFDs, etc.) for providing payment data when payment instrument 114 interacts with payment reader 118 (e.g., swipe, tap, dip, etc.). In other examples, merchant 102 may input payment data manually via POS device 106.

POS application 116 may receive the payment data from payment reader 118 (or via manual input by merchant 102). In some examples, POS application 116 may also receive customer authentication data associated with customer 104. Customer authentication data may include data authenticating the customer, such as a password, a personal identification number (PIN), a signature, a biometric indicator, etc. In at least one example, POS application 116 may receive and/or generate point-of-purchase data, which may include data identifying merchant 102, data indicating a cost of the transaction, data indicating item(s) (e.g., item 112) purchased via the transaction, a timestamp associated with the transaction, a datestamp associated with the transaction, etc. The payment data associated with payment instrument 114, the customer authentication data, and/or the point-of-purchase data may correspond to transaction data 120. POS application 116 may send transaction data 120 to server(s) 122 associated with payment processing service 108. POS application 116 may send transaction data 120 to payment processing service 108 over the network(s) 110, either contemporaneously with the conducting of the transaction (in the case of online transactions) or later when POS device 106 is online.

In response to receiving transaction data 120, payment processing service 108 can process the corresponding transaction by electronically transferring funds from a financial account associated with customer 104 to a financial account associated with merchant 102. Payment processing service 108 may be implemented by one or more servers 122 and associated software components that provide the functionality described herein. In at least one example, server(s) 122 associated with payment processing service 108 may include transaction handling module 124, risk assessment module 126, insurance processing module 128, and settlement module 130.

Transaction handling module 124 may receive transaction data 120 from POS device 106 and may communicate with one or more computing devices of payment service 132, such as a card network (or "card payment network") (e.g., VISA®, MASTERCARD®), one or more banks, processing/acquiring services, or the like, over network(s) 110 to conduct financial transactions electronically. For example, transaction handling module 124 may communicate with an acquiring bank, an issuing bank, and/or a bank maintaining customer accounts for electronic payments. Additional details associated with the transaction handling module 124 are described below.

In at least one example, merchant 102 maintains a service account with payment processing service 108 in order to subscribe to services provided by payment processing service 108. In practice, payment processing service 108 maintains multiple service accounts. In at least one example, POS device 106 may send transaction data 120 to payment processing service 108, as described above. Transaction data 120 may be associated with an account, which is typically the service account of merchant 102 that that is attempting to complete the transaction and that has submitted transaction data 120. Upon receiving transaction data 120, payment processing service 108 refers to information indicated by the associated service account in order to determine the types of services and the configuration of services to be provided to merchant 102.

The service account may contain or may reference various data associated with or relating to merchant 102, such as data regarding historical transactions, account balances, configuration information, bank account information, address information, and so forth. The service account may also indicate various status information regarding merchant 102 and the corresponding service account with payment processing service 108, such as whether the account is in good standing and/or whether the account has been frozen, such as by being disabled or restricted. Furthermore, in at least one example, the service account may be associated with one or more indicia of risk. For instance, the service account may indicate a likelihood that transactions associated with the service account will result in a chargeback due to fraud-related characteristic(s) of the transaction (e.g., a fraud risk associated with a corresponding merchant) and/or a likelihood that transactions associated with the service account will result in a chargeback due to item-related characteristics of the transaction (e.g., a credit risk associated with a corresponding merchant). As described herein, such indicia may be determined based on previously performed risk assessments.

Risk assessment module 126 may leverage data associated with the service account of merchant 102 and/or transaction data 120 to determine a level of risk associated with the transaction. In at least one example, risk assessment module 126 may leverage one or more predictive models for making predictions regarding a level of risk associated with a transaction. In at least one example, the level of risk may be based on predetermined credit risk associated with merchant 102, a predetermined fraud risk associated with merchant 102, a characteristic of the transaction (e.g., as determined based on transaction data 120), etc. Additional details associated with risk assessment module 126 are described below with reference to FIG. 2.

Insurance processing module 128 may determine when an offer for insurance should be extended to merchant 102. In at least one example, insurance processing module 128 may compare a level of risk determined by risk assessment module 126 with a threshold level of risk and, if the level of risk meets or exceeds the threshold level of risk, insurance processing module 128 may determine that an offer for insurance should be extended to merchant 102. Or, if the level of risk does not meet or is otherwise below the threshold level of risk, insurance processing module 128 may determine that an offer for insurance doesn't need to be extended to merchant 102. In addition to determining whether a transaction warrants an offer for insurance, insurance processing module 128 may determine terms of an offer. For instance, insurance processing module 128 may determine a cost of the insurance, a scope of coverage of the insurance, etc. In at least one example, insurance processing module 128 may determine terms of an offer for insurance based on a determined level of risk and/or transaction data 120. That is, a risk level above a threshold or within a range may cause the cost of the insurance to be higher than a risk level below the threshold or within a different range. Or, a particular item associated with a transaction may cause the cost of the insurance to be higher than the cost of insurance for other items.

In at least one example, insurance processing module 128 may determine that the transaction between merchant 102 and customer 104 for item 112 is associated with a level of risk that meets or exceeds a threshold level of risk. Accordingly, insurance processing module 128 may send insurance offer 134 to POS device 106. Insurance offer 134 may indicate terms of the offer (e.g., a cost of the insurance, a scope of coverage of the insurance, etc.). POS application 116 may present insurance offer 134 to POS device 106 via a user interface associated with POS device 106. POS application 116 may determine acceptance of insurance offer 134 and may send an indication of acceptance 136 to payment processing service 108. In some examples, merchant 102 may accept insurance offer 134 and may pay the cost of the insurance. Merchant 102 may be interested in purchasing insurance to improve one or more terms of settlement for settling the transaction, for example. In other examples, merchant 102 may accept insurance offer 134 on behalf of customer 104 and customer 104 may pay the cost of the insurance. Further, in at least one example, customer 104 may accept insurance offer 134 and may pay the cost of the insurance. Customer 104 may be interested in purchasing insurance to ensure that he or she receives a credit should he or she request a chargeback, for example. In yet additional examples, merchant 102 and customer 104 may each pay a portion of the cost of the insurance.

Settlement module 130 may determine how to settle a transaction between merchant 102 and payment processing service 108. For the purpose of this discussion, "settling" a transaction refers to paying merchant 102 for the transaction. As a non-limiting example, if merchant 102 utilizes services offered by payment processing service 108, payment service 132 may pay payment processing service 108 an amount of funds associated with the cost of item 112. In turn, payment processing service 108 may deposit the amount of funds (perhaps less some processing fees) into a bank account associated with merchant 102. In at least one example, settlement module 130 may leverage indication of acceptance 136 to determine whether insurance is purchased for a transaction, who (e.g., customer 104 or merchant 102) purchased the insurance, etc. Furthermore, settlement module 130 may determine how the transaction should be settled based on whether insurance is purchased and/or who purchased the insurance. Settlement module 130 may provide instructions for settling the transaction to transaction handling module 124, which may communicate with one or more computing devices of payment service 132 to execute the settlement.

As described above, techniques described herein are directed to leveraging predictive models to assess risk associated with transactions and make determinations with respect to provisioning insurance to cover potential losses associated with the transactions in near real-time. Based at least in part on merchant 102 accepting insurance offer 134, settlement module 130 may dynamically change settlement options to manage potential chargeback losses associated with the transaction. As a result, techniques described above with respect to FIG. 1 offer improvements over prior techniques for risk assessment and provisioning of insurance to mitigating risk.

Figure 2:
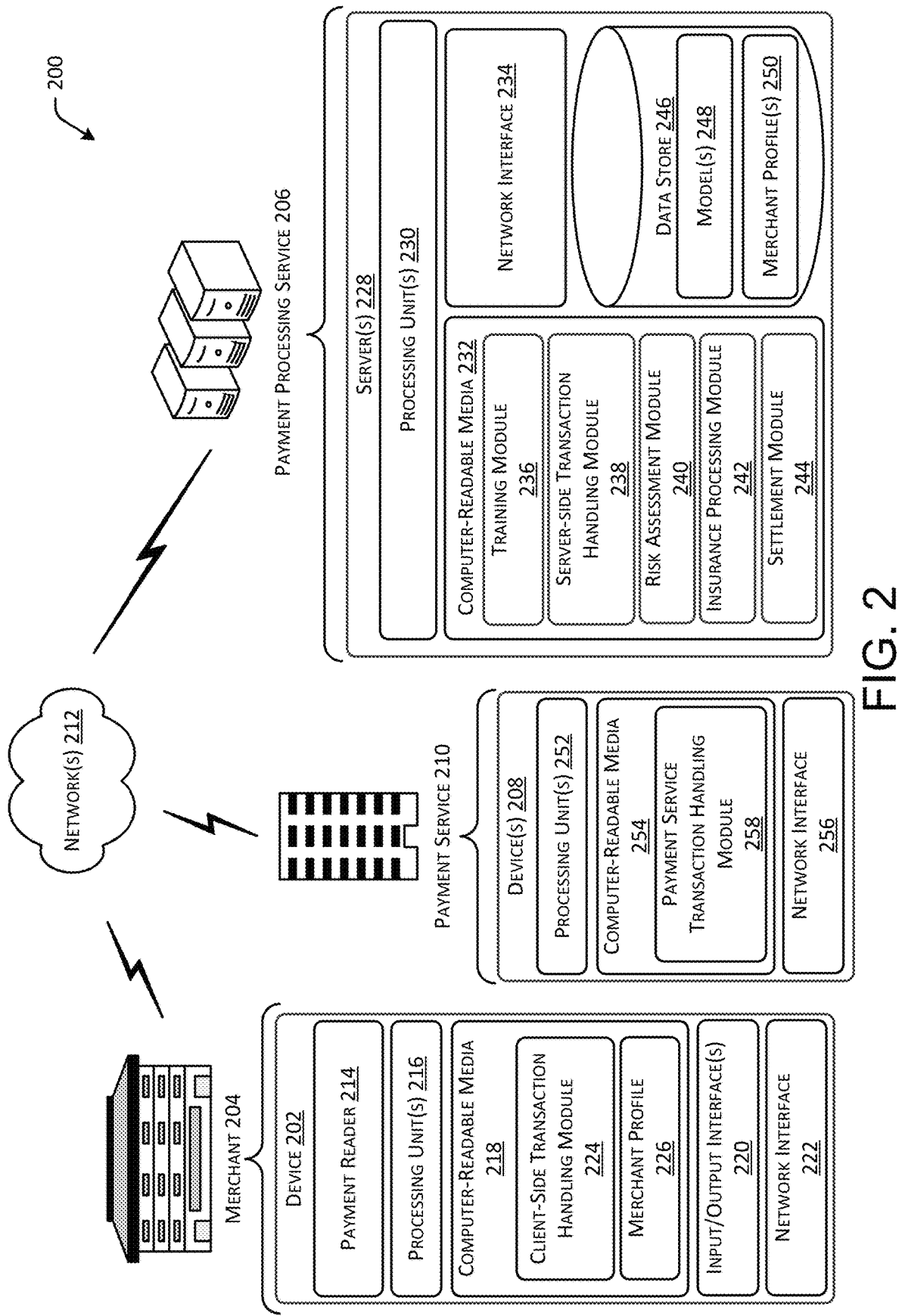
FIG. 2 depicts an illustrative block diagram of a system associated with transaction-level insurance provisioning in accordance with some examples of the present disclosure.

FIG. 2 depicts an illustrative block diagram of a system 200 associated with transaction-level insurance provisioning. The system 200 may include device 202 operated by merchant 204, which is communicatively coupled to payment processing service 206, which are capable of communicating with one or more device(s) 208 operated by payment service 210, via network(s) 212. Merchant 204 may correspond to merchant 104, payment processing service 206 may correspond to payment processing service 108, payment service 210 may correspond to payment service 132, and/or network(s) 212 may correspond to network(s) 110, as described above with reference to FIG. 1. While a single merchant 204 and device 202 are shown, in practice, multiple merchants and multiple devices may communicate with payment processing service 206 to process transactions.

Merchant 204 may operate device 202. Device 202 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc. In at least one example, device 202 may be a POS terminal, which may be connected to payment reader 214 (e.g., POS device 106, described above with reference to FIG. 1). In such an example, payment reader 214 may be capable of accepting a variety of payment instruments, such as credit cards, debit cards, gift cards, short-range communication based payment instruments, and the like. In one example, payment reader 214 may be a wireless communication device that communicates wirelessly with device 202, for example, using Bluetooth®, BLE, NFC, RFID, etc. In another example, payment reader 214 may be coupled to device 202, for example, by being insertable into a connector mechanism (e.g., phone jack, headphone jack, etc.) of a smart phone or tablet. That is, in other examples, payment reader 214 may be coupled to device 202 via a wired connection. In additional and/or alternative examples, payment reader 214 may be integral to device 202, as shown in FIG. 2. Payment reader 214 may interact with a payment instrument via a tap, dip, or swipe to obtain payment data associated with a payment instrument, as described above with reference to FIG. 1.

In at least one example, payment reader 214 may include a reader chip and/or a transaction chip which may enable payment reader 214 to control the operations and processing of payment reader 214. In an example, the reader chip may perform functionality to control payment interfaces (e.g., a contactless interface, a contact interface, etc.), a wireless communication interface, a wired interface, a power supply, a user interface (e.g., a signal condition device (FPGA)), etc. Additionally and/or alternatively, the transaction chip may perform functionality relating to processing of payment transactions, interfacing with payment instruments, cryptography, and other payment-specific functionality. That is, the transaction chip may access payment data associated with a payment instrument. The payment data may include a name of the customer, an address of the customer, a type (e.g., credit, debit, etc.) of a payment instrument, a number associated with the payment instrument, a verification value (e.g., PVKI, PVV, CVV, CVC, etc.) associated with the payment instrument, an expiration date associated with the payment instrument, a PAN corresponding to the customer (which may or may not match the number associated with the payment instrument), restrictions on what types of charges/debts may be made, etc., as described above. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionality of reader chip and transaction chip may be embodied in a single chip or a plurality of chips, each including any suitable combination of processing units and computer-readable media to collectively perform the functionalities of reader chip and transaction chip as described herein.

Device 202 may include processing unit(s) 216, computer-readable media 218, input/output interface(s) 220, and network interface 222. Processing unit(s) 216 of device 202 may execute one or more modules and/or processes to cause device 202 to perform a variety of functions, as set forth above and explained in further detail in the following disclosure. In some examples, processing unit(s) 216 may include a central processing unit (CPU), a graphics processing unit (GPU), both CPU and GPU, or other processing units or components known in the art. Additionally, each of processing unit(s) 216 may possess its own local memory, which also may store program modules, program data, and/or one or more operating systems. Depending on the exact configuration and type of device 202, computer-readable media 218 may include volatile memory (such as RAM), non-volatile memory (such as ROM, flash memory, miniature hard drive, memory card, or the like), or some combination thereof. In various examples, device 202 may include input/output interface(s) 220. Examples of input/output interface(s) 220 may include a keyboard, a mouse, a pen, a voice input device, a touch input device, a display, etc. Furthermore, device 202 may include network interface 222 for interfacing with network(s) 212, as described below.

In at least one example, computer-readable media 218 may include one or more modules to enable a merchant, e.g., merchant 204, to manage its business via interactions with payment processing service 206. The one or more modules may be implemented as more modules or as fewer modules, and functions described for the modules may be redistributed depending on the details of the implementation. For the purpose of this discussion, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an Application Program Interface (API) to perform some or all of its functionality (e.g., operations). In additional and/or alternative examples, the module(s) may be implemented as computer-readable instructions, various data structures, and so forth via at least one processing unit (e.g., processing unit(s) 216) to configure device 202 to execute instructions and to perform operations described herein. The module(s) may include client-side transaction handling module 224. In some examples, client-side transaction handling module 224 may be associated with a POS application, such as POS application 116 described above with reference to FIG. 1. In at least one example, computer-readable media 218 may also include merchant profile 226.

Client-side transaction handling module 224 may receive payment data from payment reader 214, described above. In addition to payment data, client-side transaction handling module 224 may receive customer authentication data and/or other point-of-purchase data from payment reader 214. In some examples, client-side transaction handling module 224 may determine point-of-purchase data. The payment data, the customer authentication data, and/or the point-of-purchase data may be associated with transaction data, as described above. In at least one example, client-side transaction handling module 224 may determine the transaction data based on the payment data, the customer authentication data, and/or the point-of-purchase data.

Client-side transaction handling module 224 may exchange communications with payment processing service 206. For instance, in one example, client-side transaction handling module 224 may provide transaction data to payment processing service 206. Additionally, client-side transaction handling module 224 may receive notifications from payment processing service 206 signaling the success (e.g., authorization) or failure (e.g., declination) of authorization requests of the payment data for various transactions. In some examples, client-side transaction handling module 224 may generate user interfaces for presentation via an output interface of input/output interface(s) 220, described above. In some examples, the user interfaces may communicate that a transaction was successful (i.e., payment data is authorized for the transaction), unsuccessful (i.e., payment data is not authorized for the transaction), or requires more information to proceed. In an example where a transaction requires more information to proceed, a user interface may be configured to prompt merchant 204 and/or customer for additional information to complete a transaction. In such an example, the user interface may be presented via input/output interface(s) 220.

In some examples, client-side transaction handling module 224 may receive communications regarding offers for insurance. In at least one example, client-side transaction handling module 224 may receive an offer for insurance from payment processing service 206 responsive to sending transaction data to payment processing service 206. In at least one example, client-side transaction handling module 224 may present the offer for insurance via an input/out interface 220 associated with device 220. For instance, client-side transaction handling module 224 may generate and present a graphical user interface that communicates the offer for insurance to merchant 204. The graphical user interface may include content describing term(s) of the offer and a control to enable merchant 204 to accept (or decline) the offer. In at least one example, merchant 204 may interact with the graphical user interface to indicate whether merchant 204 accepts the offer for insurance. For instance, merchant 204 may actuate a control to accept the offer. As described above, in some examples, merchant 204 may accept the insurance on behalf of merchant 204 or merchant 204 may accept the insurance on behalf of a customer. Additionally and/or alternatively, a customer may interact with the graphical user interface to accept the insurance.

Client-side transaction handling module 224 may send an indication to payment processing service 206 to indicate whether an offer for insurance has been accepted or rejected. In at least one example, such an indication may include data identifying whether merchant 204 accepted the offer on behalf of merchant 204 or whether merchant 204 accepted the offer on behalf of a customer. Additionally, the indication may identify which party (e.g., merchant 204 or the customer) is to be charged for the insurance. For instance, in some examples, a customer may accept the offer and may agree to pay for the insurance (e.g., a fee corresponding to the cost of the insurance added to a total cost of the transaction). In some examples, a merchant may accept the offer and may agree to pay for the insurance (e.g., a fee that is paid to payment processing service 206). In other examples, merchant 204 may accept the offer and may pass the cost of the insurance on to the customer, by raising the cost of an item and/or items offered for purchase by merchant 204. That is, in such examples, merchant 204 may accept the offer and the customer may ultimately pay for the insurance.

Merchant profile 226 may store data associated with a merchant (e.g., merchant 204) including, but not limited to, data including information about merchant 204 (e.g., name of the merchant, geographic location of the merchant, types of goods or services offered by the merchant, operating hours of the merchant, a merchant identifier, a merchant category classification, etc.), information about events associated with merchant 204 (e.g., past and upcoming events, dates of events, locations of events, etc.), accounting information associated with merchant 204 (e.g., bank(s) that the merchant banks with, etc.), contractual information associated with merchant 204 (e.g., terms of a contract between the merchant and the payment processing service), transactional information associated with merchant 204 (e.g., transactions conducted by the merchant, goods and/or service associated with the transactions, total spends of each of the transactions, parties to the transactions, dates, times, and/or locations associated with the transactions, refunds associated with the transactions, chargeback requests associated with the transactions, disputes associated with the transactions, etc.), etc. In some examples, at least a portion of merchant profile 226 may be stored in association with payment processing service 206, as described below.

As described above, device 202 may communicate with payment processing service 206 via network(s) 212. Payment processing service 206 may include one or more servers 228. Server(s) 228 may include processing unit(s) 230, computer-readable media 232, and network interface 234. Processing unit(s) 230 of server(s) 228 may execute one or more modules and/or processes to cause server(s) 228 to perform a variety of functions, as set forth above and explained in further detail in the following disclosure. In some examples, processing unit(s) 230 may include a CPU, a GPU, both CPU and GPU, or other processing units or components known in the art. Additionally, each of processing unit(s) 230 may possess its own local memory, which also may store program modules, program data, and/or one or more operating systems. Depending on the exact configuration and type of server(s) 228, computer-readable media 232 may include volatile memory (such as RAM), non-volatile memory (such as ROM, flash memory, miniature hard drive, memory card, or the like), or some combination thereof. Server(s) 228 may include network interface 234 for interfacing with network(s) 212, as described below.

In at least one example, computer-readable media 232 may include one or more modules for processing transactions. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 230) to configure server(s) 228 to execute instructions and to perform operations described herein. The module(s) may include training module 236, server-side transaction handling module 238, risk assessment module 240, insurance processing module 242, and settlement module 244.

Training module 236 may be configured to train predictive model(s). In an example, training module 236 may train a predictive model for determining risk associated with individual transactions. In some examples, a value may be a discrete number (e.g., a rank, a level, etc.), a probability, a percentage, or another indicator. In at least one example, the value may indicate a likelihood that a transaction will be associated with a chargeback request. In at least one example, training module 236 may utilize a machine-learning mechanism to build, modify, or otherwise utilize a predictive model that is created from example inputs and makes predictions or decisions. In such an example, the predictive model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.

In at least one example, training module 236 may access training data. In at least one example, the training data may include historical transaction data and merchant data (which may or may not be based on the historical transaction data) associated with a plurality of merchants. In some examples, the training data may include customer data associated with the historical transaction data. For training a predictive model, the training data may include, for each historical transaction, an indication whether the transaction was associated with a chargeback request and one or more characteristics associated with the transaction. For instance, the one or more characteristics may include a creditworthiness rating associated with a merchant involved in the transaction (as determined by a data model for predicting creditworthiness based on item-level characteristics and/or a data model for predicting creditworthiness based on fraud-related characteristics), a classification of the merchant, a cost of the transaction, item(s) purchased via the transaction, a payment instrument type associated with the transaction, a type of the transaction (e.g., card not present (CNP) or card present), a geolocation of the transaction, whether other insurances and/or warranties are applicable to the transaction, etc. In some examples, the one or more characteristics may be associated with a customer associated with the transaction. For instance, a characteristic may indicate that a cost of a transaction is above or below an average spend for the customer, a geolocation associated with the transaction is different from a geolocation where the customer typically conducts transactions, etc.

Training module 236, via a machine-learning mechanism, may analyze the training data and may learn which characteristics are indicative of risk. As a result, transactions associated with such characteristics may be associated with values that are indicative of risk. For instance, in at least one example, types of transactions (e.g., CNP or card present) may be indicative of risk. Or, geographic locations may be indicative of risk. In some examples, a merchant category classification may be indicative of risk. Or, a particular item may be indicative of risk. Furthermore, previously determined risk associated with a merchant (e.g., creditworthiness, fraud, etc.) may be indicative or risk. Additionally and/or alternatively, particular characteristics of a customer may be indicative of risk. Various other characteristics may be indicative of risk and may therefore be used to train a predictive model to output a value reflective of such risk.

Training module 236 may store trained model(s) in data store 246 associated with server(s) 228. In at least one example, the model(s) may be stored in model(s) database 248 of data store 246. Training module 236 may receive updated training data for iteratively training and updating the predictive model(s). Additional details associated with training predictive model(s) are described below with reference to FIG. 3.

In at least one example, server-side transaction handling module 238, which may correspond to transaction handling module 124 described above with reference to FIG. 1, may receive transaction data from device 202 and may communicate with one or more devices 208 of payment service 210, such as a card network (or "card payment network") (e.g., VISA®, MASTERCARD®), one or more banks, processing/acquiring services, or the like, over network(s) 212 to conduct financial transactions electronically (based on the transaction data). For example, server-side transaction handling module 238 may communicate with an acquiring bank, an issuing bank, and/or a bank maintaining customer accounts for electronic payments.

Risk assessment module 240, which may correspond to risk assessment module 126 described above with reference to FIG. 1, may determine a level of risk associated with a transaction utilizing one or more predictive models. In some examples, risk assessment module 240 may perform a risk assessment of a transaction responsive to receiving transaction data associated with a transaction processed on behalf of merchant 204. That is, in some examples, risk assessment module 240 may perform a risk assessment for each transaction. In at least one example, the transaction data may include an identifier, which may be used by risk assessment module 240 to locate a service account and/or merchant profile corresponding to a merchant associated with the transaction data (e.g., merchant 204). Risk assessment module 240 may retrieve merchant data associated with the service account and/or merchant profile. As described above, risk assessment module 240 may leverage merchant data and/or transaction data associated with a transaction to determine a level of risk associated with a transaction. That is, risk assessment module 240 may access model(s) database 248 and analyze merchant data and/or transaction data associated with a transaction to determine a level of risk associated with the transaction. In at least one example, the level of risk may be based on a predetermined credit risk associated with merchant 204, a predetermined fraud risk associated with merchant 204, a characteristic of the transaction (e.g., as determined based on transaction data), etc. In at least one example, the risk assessment module 240 may output a level of risk associated with the transaction.

Insurance processing module 242, which may correspond to insurance processing module 128 described above with reference to FIG. 1, may determine when an offer for insurance should be extended to merchant 204. In at least one example, insurance processing module 242 may compare a level of risk determined by risk assessment module 240 with a threshold level of risk and, if the level of risk meets or exceeds the threshold level of risk, insurance processing module 242 may determine that an offer for insurance should be extended to merchant 204. Or, if the level of risk does not meet or is otherwise below the threshold level of risk, insurance processing module 242 may determine that an offer for insurance does not need to be extended to merchant 204. In addition to determining whether a transaction warrants an offer for insurance, insurance processing module 242 may determine terms of an offer. For instance, insurance processing module 242 may determine a cost of the insurance, a scope of coverage of the insurance, etc. In at least one example, insurance processing module 242 may determine terms of an offer for insurance based on a determined level of risk and/or transaction data. That is, a risk level above a threshold or within a range may cause the cost of the insurance to be higher than a risk level below the threshold or within a different range. Or, a total cost of a transaction that is above a threshold may cause the cost of the insurance to be higher than the cost of a transaction having a total cost that is below the threshold.

In at least one example, insurance processing module 242 may determine that a transaction between merchant 204 and a customer for an item is associated with a level of risk that meets or exceeds a threshold level of risk. Accordingly, insurance processing module 242 may send an insurance offer to device 202. The insurance offer may indicate terms of the offer (e.g., a cost of the insurance, a scope of coverage of the insurance, etc.). As described above, client-side transaction handling module 224 may present the insurance offer via a user interface associated with device 202. In at least one example, insurance processing module 242 may receive an indication from device 202 indicating whether the insurance offer is accepted. As described above, in some examples, the indication can identify which party (e.g., merchant 204 or the customer) accepted the insurance offer and/or which party (e.g., merchant 204 or the customer) is to be charged for the insurance.

Settlement module 244, which may correspond to settlement module 130, may determine how to settle a transaction between merchant 204 and payment processing service 206. As described above, "settling" a transaction refers to paying merchant 204 for the transaction. As a non-limiting example, if merchant 204 utilizes services offered by payment processing service 206, payment service 210 may pay payment processing service 206 an amount of funds associated with the transaction. In turn, payment processing service 206 may deposit the amount of funds (perhaps less some processing fees) into a bank account associated with merchant 204. In at least one example, settlement module 244 may leverage an indication indicating whether insurance is purchased for a transaction, who (e.g., customer or merchant 204) purchased the insurance, etc. Furthermore, settlement module 244 may determine how a transaction should be settled based on whether insurance was purchased and/or who purchased the insurance. Settlement module 244 may provide instructions for settling the transaction to server-side transaction handling module 236, which may communicate with one or more computing devices of payment service 210 to execute the settlement.

Server(s) 228 may further include data store 246, as described above. Data store 246 may be configured to store data so that it may be accessible, manageable, and updatable. Data store 246 may be communicatively coupled to server(s) 228 or integrated with server(s) 228. In at least one example, data store 246 may include a model(s) database 248 and a merchant profile(s) database 250. In some examples, the model(s) database 248 and the merchant profile(s) database 250 may be associated with individual databases, as illustrated in FIG. 2. In other examples, the model(s) database 248 and the merchant profile(s) database 250 may be associated with a single database. The model(s) database 248 may store one or more predictive models trained via training module 236, as described above.

The merchant profile(s) database 250 may store one or more merchant profiles. A merchant profile may store data associated with a merchant (e.g., merchant 204) including, but not limited to, data including information about merchant 204 (e.g., name of the merchant, geographic location of the merchant, types of goods or services offered by the merchant, operating hours of the merchant, a merchant identifier, a merchant category classification, etc.), information about events associated with merchant 204 (e.g., past and upcoming events, dates of events, locations of events, etc.), accounting information associated with merchant 204 (e.g., bank(s) that the merchant banks with, etc.), contractual information associated with merchant 204 (e.g., terms of a contract between the merchant and the payment processing service), transactional information associated with merchant 204 (e.g., transactions conducted by the merchant, goods and/or service associated with the transactions, total spends of each of the transactions, parties to the transactions, dates, times, and/or locations associated with the transactions, refunds associated with the transactions, chargeback requests associated with the transactions, disputes associated with the transactions, etc.), etc. Furthermore, in at least one example, information associated with a service account of a merchant may be mapped to, or otherwise associated with, a merchant profile.

Additionally, in at least one example, indicia of previously determined risk assessment(s) may be mapped to, or otherwise associated with, a merchant profile of merchant 204. In at least on example, a level of risk associated with the creditworthiness of merchant 204 (e.g., a value indicative of the credit risk associated with merchant 204) may be mapped to, or otherwise associated with, a merchant profile of merchant 204. For instance, one or more data models may be trained to determine whether a merchant (i.e., a service account associated with the merchant) is likely to receive a chargeback in association with a transaction based on risk determined to be associated with the merchant. In at least one example, such data model(s) may determine whether a merchant is likely to receive a chargeback for a non-fraud related purpose based on item-related attributes of a merchant. Additional details associated with determining such an indicator of risk are described in co-pending U.S. patent application Ser. No. 15/636,399, the contents of which are incorporated by reference herein in its entirety.

In at least on example, a level of risk indicative of a likelihood that transactions processed by merchant 204 will be associated with a chargeback for fraud-related purposes (e.g., a value indicative of the fraud risk associated with merchant 204) may be mapped to, or otherwise associated with, a merchant profile of merchant 204. In at least one example, one or more data models may determine whether a merchant is likely to receive a chargeback for a fraud related purpose based on various attributes of a merchant.

Additional details associated with determining such an indicator of risk are described in co-pending U.S. patent application Ser. No. 15/181,962 and Ser. No. 15/182,033, the contents of each which are incorporated by reference herein in their entireties.

As described above, in some examples, at least some merchant data may be stored in merchant profile 226 on device 202.

As described above, payment processing service 206 may communicate with payment service 210 via network(s) 212 to process transaction(s). For the purpose of this discussion, payment service 210 may be a card network (or "card payment network") (e.g., VISA®, MASTERCARD®), one or more banks, processing/acquiring services, or the like, over network(s) 110 to conduct financial transactions electronically. For example, payment service 210 may be an acquiring bank, an issuing bank, and/or a bank maintaining customer accounts for electronic payments. An acquiring bank may be a registered member of a card association (e.g., VISA®, MASTERCARD®), and may be part of a card payment network. An issuing bank may issue payment cards to customers, and may pay acquiring banks for purchases made by cardholders to which the issuing bank has issued a payment card. Accordingly, in some examples, payment service 210 associated with an acquiring bank may be included in the system 200 and may communicate with payment service 210 associated with of a card-issuing bank to obtain payment. Further, in some examples, a customer may use a debit card or gift card instead of a credit card, in which case, payment service 210 associated with a bank or other institution corresponding to the debit card or gift card may receive communications regarding a transaction in which the customer is participating. Additionally, there may be payment services of other financial institutions involved in some types of transactions or in alternative system architectures, and thus, the foregoing are merely several examples for discussion purposes.

In at least one example, payment service 210 may include one or more devices 208, as described above. In some examples, the device(s) 208 may be one or more servers and/or another type of device. For instance, a device of the device(s) 208 may be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated register device, a wearable computing device or other body-mounted computing device, an augmented reality device, etc.

The device(s) 208 may include processing unit(s) 252, computer-readable media 254, and network interface 256. Processing unit(s) 252 may execute one or more modules and/or processes to cause the device(s) 208 to perform a variety of functions, as set forth above and explained in further detail in the following disclosure. In some examples, processing unit(s) 252 may include a CPU, a GPU, both CPU and GPU, or other processing units or components known in the art. Additionally, each of processing unit(s) 252 may possess its own local memory, which also may store program modules, program data, and/or one or more operating systems. Depending on the exact configuration and type of the device(s) 208, computer-readable media 254 may include volatile memory (such as RAM), non-volatile memory (such as ROM, flash memory, miniature hard drive, memory card, or the like), or some combination thereof. The device(s) 208 may include network interface 256 for interfacing with network(s) 212, as described below.

In at least one example, computer-readable media 254 may include one or more modules for processing transactions. The one or more modules may be implemented as more modules or as fewer modules, and functions described for the modules may be redistributed depending on the details of the implementation. As described above, the term "module" refers broadly to software stored on non-transitory storage medium (e.g., volatile or non-volatile memory for a computing device), hardware, or firmware (or any combination thereof) modules. Modules are typically functional such that they may generate useful data or other output using specified input(s). A module may or may not be self-contained. An application program (also called an "application") may include one or more modules, or a module may include one or more application programs. In some examples, a module may include an API to perform some or all of its functionality (e.g., operations). In additional and/or alternative examples, the module(s) may be implemented as computer-readable instructions, various data structures, and so forth via at least one processing unit (e.g., processing unit(s) 252) to configure the device(s) 208 to execute instructions and to perform operations described herein. The module(s) may include payment service transaction handling module 258.

Payment service transaction handling module 258 may exchange communications with server-side transaction handling module 238. In at least one example, server-side transaction handling module 238 may send authorization request(s) (e.g., to request authorization of payment data for a cost of a transaction), capture request(s) (e.g., to capture funds for the cost of a transaction), etc. to payment service 210. For instance, server-side transaction handling module 238 may send an authorization request for authorization of a particular payment instrument for a particular amount (e.g., a cost of a transaction). In some examples, the authorization request may be for a cost of the transaction and a cost of the insurance (if the insurance is purchased by a customer, for example). In at least one example, the authorization request may include payment data, as described above. In at least one example, the payment service transaction handling module 222 may send communications indicating whether authorization request(s), capture request(s), etc. are approved, processing, etc.

In some examples, payment service transaction handling module 258 may receive an indication that a customer disputes a transaction. That is, payment service transaction handling module 258 may receive a request to reverse a charge associated with the transaction (i.e., a chargeback request). As described above, based on receiving a complaint from a customer, payment service 210 may reverse a charge as a form of customer protection. Accordingly, payment service 210 may send a request to payment processing service 206 for an amount of the chargeback request. In such examples, server-side transaction handling module 238 may process the chargeback request and, if insurance was not purchased for the transaction, may send a request to merchant 204 for the amount of the chargeback request. In some examples, as described above, processing a chargeback request may be associated with fees that are assessed on payment processing service 206 and/or merchant 204. In some examples, payment processing service 206 may not be able to recover the cost of the chargeback request. In at least one example, server-side transaction handling module 238 may process the request and, if insurance was purchased for the transaction, server-side transaction handling module 238 may draw on a reserve fund generated from previously purchased insurance offered by payment processing service 206 to pay the amount of the chargeback request and/or any associated fees to payment service 210.

Network(s) 212 may be any type of network known in the art, such as a local area network or a wide area network, such as the Internet, and may include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 212 may include both wired and/or wireless communication technologies, including Bluetooth®, BLE, Wi-Fi and cellular communication technologies, as well as wired or fiber optic technologies. Components used for such communications may depend at least in part upon the type of network, the environment selected, or both. Protocols for communicating over such networks are well known and will not be discussed herein in detail. Consequently, device 202, device(s) 208, and/or server(s) 228 may communicatively couple to network(s) 212 in any manner, such as by a wired or wireless connection. Network(s) 212 may also facilitate communication between device 202, device(s) 208, and/or server(s) 228. In turn, network interfaces (e.g., network interface 222, network interface 234, and/or network interface 256) may be any network interface hardware components that may allow device 202, device(s) 208, and/or server(s) 228 to communicate over network(s) 212.

While FIG. 2 describes determining risk for a transaction and determining whether to offer insurance for the transaction based on the determined risk, in some examples, risk assessment module 240 may determine a level of risk for a portion of a transaction and insurance processing module 242 may determine whether to send an offer for insurance for the portion of the transaction. In such examples, settlement module 244 may determine how to settle the transaction based on whether insurance was purchased for the portion of the transaction. That is, in some examples, techniques described herein may provide item-level insurance to mitigate risk for portions of transactions in addition to, or as an alternative of, transaction-level insurance.

FIGS. 3-6 illustrate various processes in accordance with some examples of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks may be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIGS. 3-6 are described in the context of the environment 200 described above with reference to FIG. 2, but need not be limited to such an environment.

FIG. 3 depicts a non-limiting flow diagram illustrating a process for training predictive model(s).

Block 302 illustrates receiving transaction data corresponding to transactions associated with a plurality of merchants. As described above, in at least one example, server-side transaction handling module 238 may receive transaction data from device 202. In addition to receiving transaction data from device 202, server-side transaction handling module 238 may receive transaction data from multiple devices corresponding to multiple merchants.

Block 304 illustrates compiling training data based at least in part on the transaction data, an individual training data item being associated with an indication whether a corresponding transaction was associated with a chargeback request and one or more characteristics of the transaction. In at least one example, server-side transaction handling module 238 may aggregate the transaction data received over time and store the aggregated transaction data in data store 246. The aggregated transaction data may represent historical transaction data representative of previous transactions of one or more merchants. The aggregated transaction data may be used as training data. As described above, the training data may include, for each historical transaction, an indication whether the transaction was associated with a chargeback request and one or more characteristics associated with the transaction. For instance, the one or more characteristics may include a creditworthiness rating associated with a merchant involved in the transaction (as determined by a data model for predicting creditworthiness based on item-level characteristics and/or a data model for predicting creditworthiness based on fraud-related characteristics), a classification of the merchant, a cost of the transaction, item(s) purchased via the transaction, a payment instrument type associated with the transaction, a type of the transaction (e.g., CNP or card present), a geolocation of the transaction, whether other insurances and/or warranties are applicable to the transaction, etc. In some examples, the one or more characteristics may be associated with a customer of the transaction. For instance, a characteristic may indicate that a cost of a transaction is above or below an average spend for the customer, a geolocation associated with the transaction is different from a geolocation where the customer typically conducts transactions, etc.

Block 306 illustrates training a predictive model based at least in part on the training data, the predictive model determining a value indicating risk associated with a transaction. In at least one example, training module 236 may utilize a machine-learning mechanism to build, modify, or otherwise utilize a predictive model that is created from example inputs (e.g., the training data described above) and makes predictions or decisions. In such an example, the predictive model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. The predictive model may output a value that is representative of risk associated with a particular transaction. That is, the predictive model may output a value indicative of a likelihood that a particular transaction will be associated with a chargeback request.

Training module 236, via a machine-learning mechanism, may analyze the training data and may learn which data items are indicative of risk. As a result, transactions associated with such data items may be associated with values that are indicative of such risk. For instance, in at least one example, types of transactions (e.g., CNP or card present)

may be indicative of risk. Or, geographic locations may be indicative of risk. In some examples, a merchant category classification may be indicative of risk. Or, a particular item may be indicative of risk. Furthermore, previously determined risk associated with a merchant (e.g., creditworthiness based on item-related characteristics and/or fraud-related characteristics) may be indicative or risk. Additionally and/or alternatively, particular characteristics of a customer may be indicative or risk. Various other characteristics may be indicative of risk and may therefore be used to train a predictive model to output a value reflect of such risk.

Block 308 illustrates iteratively updating the predictive model. In at least one example, training module 236 may receive updated training data. For instance, training module 236 may receive updated training data after a lapse of a predetermined period of time, at a particular frequency, after each transaction, etc. The updated training data may include data associated with new transaction(s), output(s) of processing the data associated with the new transaction(s) using the predictive model(s), and data indicating whether any portion of the new transaction(s) was associated with a chargeback request. In at least one example, training module 236 may receive updated training data and may re-train the data model based at least partly on the updated training data.

Training module 236 may train predictive model(s) based on entire transactions or portions of transactions. That is, in some examples, training data used for training a predictive model may be based on transaction-level characteristics. In other examples, training data used for training a predictive model may be more granular and may be based on item-level characteristics. Nevertheless, a training data item may indicate an item of a transaction, whether a chargeback request was made in association with the item, and one or more characteristics of the transaction. In such an example, the predictive model may output a level of risk associated with individual item(s) of a transaction.

Figure 4:
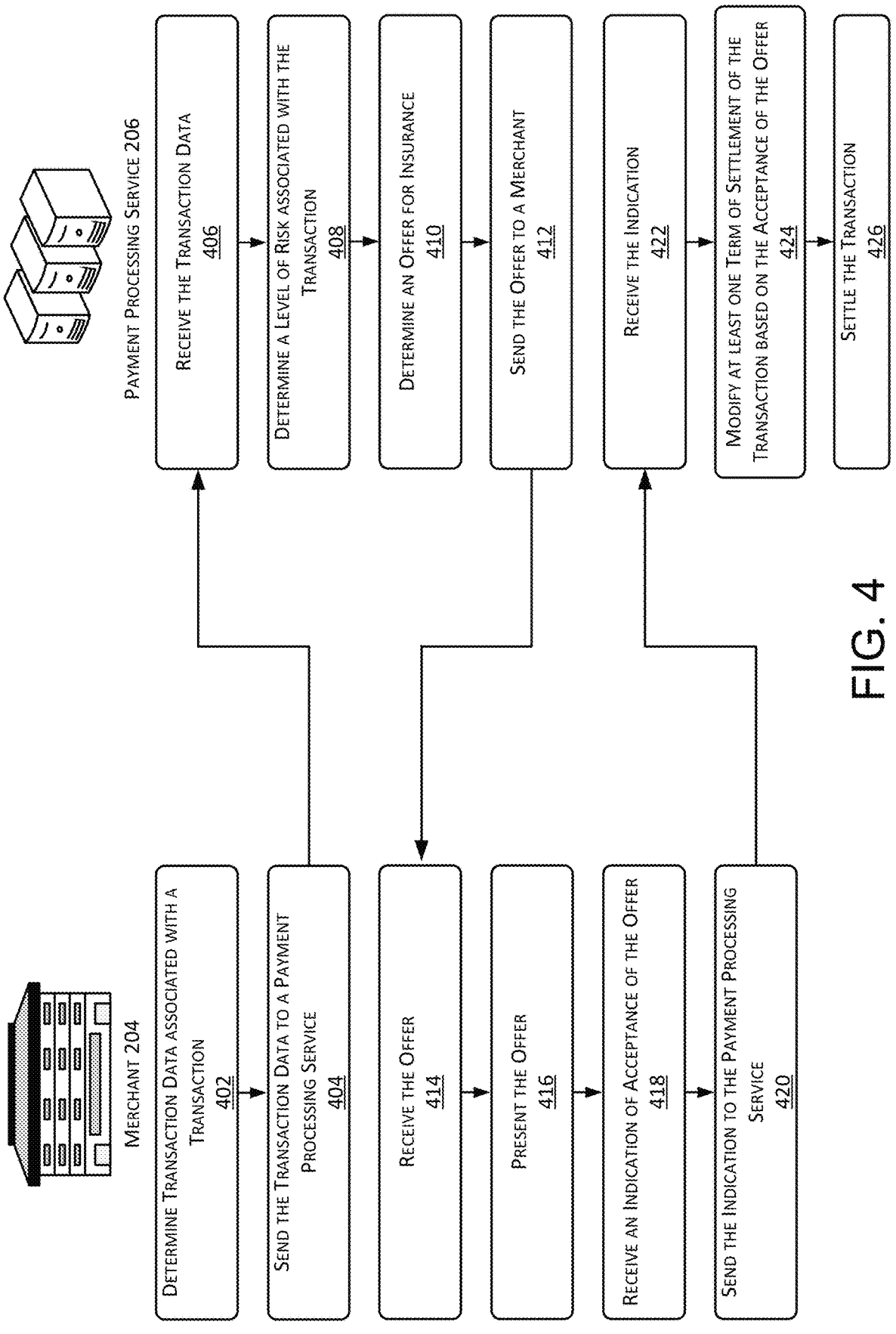
FIG. 4 depicts a non-limiting flow diagram illustrating a process for assessing risk associated with a transaction, determining an offer for insuring the transaction, and processing the transaction based on acceptance of the offer in accordance with some examples of the present disclosure.

FIG. 4 depicts a non-limiting flow diagram illustrating a process 400 for assessing risk associated with a transaction, determining an offer for insurance of the transaction, and processing the transaction based acceptance of the offer for insurance. Blocks illustrated in the left column may be performed by device 202, which may be associated with merchant 204, and blocks illustrated in the right column may be performed by server(s) 228, which may be associated with payment processing service 206.

Block 402 illustrates determining transaction data associated with a transaction. Client-side transaction handling module 224 may receive payment data from payment reader 214, described above. In addition to payment data, client-side transaction handling module 224 may receive customer authentication data and/or other point-of-purchase data from payment reader 214. In some examples, client-side transaction handling module 224 may determine point-of-purchase data. The payment data, the customer authentication data, and/or the point-of-purchase data may be associated with transaction data, as described above. That is, client-side transaction handling module 214 may determine transaction data based on payment data, the customer authentication data, and/or the point-of-purchase data. Client-side transaction handling module 214 may send the transaction data to payment processing service 206, as illustrated in block 404.

Block 406 illustrates receiving the transaction data. In at least one example, server-side transaction handling module 238 may receive the transaction data and may provide the transaction data to risk assessment module 240.

Block 408 illustrates determining a level of risk associated with the transaction. In at least one example, risk assessment module 240 may receive the transaction data from server-side transaction handling module 238. The transaction data may include an identifier, which may be used by risk assessment module 240 to locate a service account and/or merchant profile corresponding to a merchant associated with the transaction data (e.g., merchant 204). Risk assessment module 240 may retrieve merchant data associated with the service account and/or merchant profile. As described above, risk assessment module 240 may leverage merchant data and/or transaction data associated with a transaction to determine a level of risk associated with a transaction. In at least one example, risk assessment module 240 may leverage one or more predictive models for making predictions regarding a level of risk associated with a transaction. That is, risk assessment module 240 may access model(s) database 248 and analyze merchant data and/or transaction data associated with a transaction to determine a level of risk associated with the transaction. In at least one example, the level of risk may be based on a predetermined credit risk associated with merchant 204, a predetermined fraud risk associated with merchant 204, a characteristic of the transaction (e.g., as determined based on transaction data), etc. In at least one example, the risk assessment module 240 may output a level of risk associated with the transaction.

Block 410 illustrates determining an offer for insurance. Insurance processing module 242 may determine when an offer for insurance should be extended to merchant 204, as described above. In at least one example, insurance processing module 242 may compare the level of risk determined by risk assessment module 240 with a threshold level of risk and, if the level of risk meets or exceeds the threshold level of risk, insurance processing module 242 may determine that an offer for insurance should be extended to merchant 204. In addition to determining whether a transaction warrants an offer for insurance, insurance processing module 242 may determine terms of an offer. For instance, insurance processing module 242 may determine a cost of the insurance, a scope of coverage of the insurance, etc. In at least one example, insurance processing module 242 may determine terms of an offer for insurance based on a determined level of risk and/or transaction data, as described above.

Based at least in part on determining that a transaction is associated with a level of risk that meets or exceeds a threshold level of risk, insurance processing module 242 may send an insurance offer to device 202, as illustrated in block 412. The insurance offer may indicate terms of the offer (e.g., a cost of the insurance, a scope of coverage of the insurance, etc.).

Block 414 illustrates receiving the offer. As described above, client-side transaction handling module 224 may receive communications regarding offers for insurance. In at least one example, client-side transaction handling module 224 may receive an offer for insurance from payment processing service 206 responsive to sending transaction data to payment processing service 206. In at least one example, client-side transaction handling module 224 may present the offer for insurance, as illustrated in block 416. For instance, in at least one example, client-side transaction handling module 224 may present the offer for insurance via an input/out interface 220 associated with device 202. In at least one example, client-side transaction handling module 224 may generate and present a graphical user interface that communicates the offer for insurance to merchant 204. The graphical user interface may include content describing term(s) of the offer and a control to enable merchant 204 to accept (or decline) the offer.

Block 418 illustrates receiving an indication of acceptance of the offer. In at least one example, merchant 204 may interact with the graphical user interface to indicate whether merchant 204 accepts the offer for insurance. For instance, merchant 204 may actuate a control to accept the offer. As described above, in some examples, merchant 204 may accept the insurance on behalf of merchant 204 or merchant 204 may accept the insurance on behalf of a customer. Or, a customer may interact with the graphical user interface to accept the insurance. Client-side transaction handling module 224 may send the indication to payment processing service 206, as illustrated in block 420.

Block 422 illustrates receiving the indication. In at least one example, insurance processing module 242 may receive an indication from device 202 indicating whether the insurance offer is accepted. As described above, in some examples, the indication can identify which party (e.g., merchant 204 or customer) accepted the insurance offer and/or which party (e.g., merchant 204 or the customer) is to be charged for the insurance.

Block 424 illustrates modifying at least one term of settlement of the transaction based on the acceptance of the offer. As described above, settlement module 244 may determine how to settle a transaction between merchant 204 and payment processing service 206. In at least one example, settlement module 244 may leverage an indication indicating whether insurance is purchased for a transaction, who (e.g., customer or merchant 204) purchased the insurance, etc. to determine how a transaction should be settled.

In an example, settlement module 244 may modify at least one term of settlement of the transaction. For instance, in at least one example, settlement module 244 may decrease an amount of time delay after the transaction that server-side transaction handling module 236 deposits funds for payment of the transaction into a bank account associated with merchant 204. That is, based on merchant 204 purchasing insurance, server-side transaction handling module 236 may enable instant deposit. Or, in an additional and/or alternative example, settlement module 244 may decrease the amount of funds withheld from an initial deposit of funds for payment of the transaction into a bank account associated with merchant 204 as a result of the insurance being purchased. In at least one example, settlement module 244 may adjust processing fees assessed to merchant 204 or adjust some other term of settlement of the transaction.

In at least one example, settlement module 244 may determine how to allocate portions of a combined cost of a total cost of a transaction and a cost of the insurance between merchant 204 and payment processing service 206. Additional details associated with determining such allocation are described below with reference to FIG. 6.

Settlement module 244 may provide instructions for settling the transaction to server-side transaction handling module 236.

Block 426 illustrates settling the transaction. Server-side transaction handling module 238 may utilize the transaction data and the instructions received from settlement module 244 and may communicate with one or more devices 208 of payment service 210 over network(s) 212 to conduct financial transactions electronically. For example, server-side transaction handling module 238 may communicate with an acquiring bank, an issuing bank, and/or a bank maintaining customer accounts for electronic payments. In some examples, server-side transaction handling module 238 may deposit a first portion of a combined cost of a transaction into a bank account corresponding to merchant 204 and a second portion of a combined cost of a transaction into reserve fund from which payment processing service 206 pays out insurance claims and/or otherwise recovers losses resulting from chargeback requests. The first portion may correspond to a total cost of the transaction and the second portion may correspond to a cost of the insurance. In some examples, the first portion may be reduced by the cost of the insurance and/or other processing fees charged to merchant 204 by payment processing service 206. Additional details associated with settling transaction(s) are described below with reference to FIG. 6.

FIG. 5 depicts a non-limiting flow diagram illustrating a process 500 for determining an offer for insurance of a transaction based on a determined level of risk of the transaction and processing the transaction based on acceptance of the offer for insurance.

Block 502 illustrates determining a level of risk associated with a transaction. As described above, in at least one example, risk assessment module 240 may receive transaction data from server-side transaction handling module 238. The transaction data may include an identifier, which may be used by risk assessment module 240 to locate a service account and/or merchant profile corresponding to a merchant associated with the transaction data (e.g., merchant 204). Risk assessment module 240 may retrieve merchant data associated with the service account and/or merchant profile. As described above, risk assessment module 240 may leverage merchant data and/or transaction data associated with a transaction to determine a level of risk associated with a transaction. In at least one example, risk assessment module 240 may leverage one or more predictive models for making predictions regarding a level of risk associated with a transaction. That is, risk assessment module 240 may access model(s) database 248 and analyze merchant data and/or transaction data associated with a transaction to determine a level of risk associated with the transaction. In at least one example, the level of risk may be based on a predetermined credit risk associated with merchant 204, a predetermined fraud risk associated with merchant 204, a characteristic of the transaction (e.g., as determined based on transaction data), etc. In at least one example, the risk assessment module 240 may output a level of risk associated with the transaction.

Block 504 illustrates determining whether the level of risk meets or exceeds a threshold level of risk. In at least one example, insurance processing module 242 may compare a level of risk determined by risk assessment module 240 with a threshold level of risk. Based at least in part on determining that the level of risk meets or exceeds the threshold level of risk, insurance processing module 242 may determine an offer for insurance, as illustrated in block 506. As described above, in at least one example, insurance processing module 242 may determine terms of an offer for insurance based on a determined level of risk and/or transaction data.

Block 508 illustrates settling the transaction based on whether the offer for insurance is accepted. As described above with reference to FIG. 4, if an offer for insurance is accepted, settlement module 244 may modify at least one term of settlement of the transaction. If an offer for insurance is not accepted, settlement module 244 may determine to settle a transaction pursuant to standard terms of settlement (e.g., as determined per a service agreement associated with a corresponding merchant profile and/or service account) or terms of settlement that are less favorable to merchant 204 than the standard terms (e.g., delay deposit, withhold predetermined amount of funds from initial deposit into bank account of merchant 204, etc.). That is, responsive to merchant 204 (or a customer) purchasing insurance for the transaction, one or more terms of settlement of the transaction may be modified to the benefit of merchant 204 because the level of risk association with the transaction may be reduced due to the insurance purchased for the transaction. That is to say, a transaction may be determined to be less risky because payment processing service 206 may be able to recover potential loss due to a chargeback request via the insurance.

Based at least in part on determining that the level of risk does not meet or exceed the threshold level of risk, server-side transaction handling module 238 may settle the transaction, as illustrated in block 510. That is, based on determining that a transaction is not particularly risky, server-side transaction handling module 238 may settle the transaction pursuant to standard terms of settlement (e.g., as determined per a service agreement associated with a corresponding merchant profile and/or service account).

FIG. 6 depicts a non-limiting flow diagram illustrating a process 600 for settling a transaction.

Block 602 illustrates receiving an indication of an acceptance of an offer for insurance for a transaction. As described above with reference to FIG. 4, insurance processing module 242 may receive an indication from device 202 indicating whether an offer for insurance is accepted. In some examples, the indication can identify which party (e.g., merchant 204 or the customer) accepted the offer and/or which party (e.g., merchant 204 or the customer) is to be charged for the insurance.

Block 604 illustrates determining whether a merchant or a customer is paying for the insurance. As described above, the indication received from device 202 may indicate whether merchant 204 or the customer is to be charged for the insurance. Based at least in part on determining that merchant 204 is paying for the insurance, server-side transaction handling module 238 may process payment data associated with the transaction for a cost of the transaction, as illustrated in block 608. That is, server-side transaction handling module 238 may send an authorization request to payment service 210 to authorize the payment data for a cost of the transaction. Responsive to receiving an indication that the payment data is authorized for the cost of the transaction, server-side transaction handling module 238 may send a capture request to payment service 210 for a cost of the transaction.

Block 610 illustrates withholding the cost of the insurance from a first amount of funds associated with the total cost of the transaction that is to be deposited into a bank account associated with the merchant for payment of the transaction. Based on merchant 204 paying for the insurance, server-side transaction handling module 238 may withhold the cost of the insurance from a first amount of funds associated with the total cost of the transaction that is to be deposited into a bank account associated with the merchant for payment of the transaction. Then, server-side transaction handling module 238 may deposit a second amount of funds corresponding to the total cost less the cost of the insurance into the bank account associated with the merchant for payment of the transaction, as illustrated in block 612, and may deposit a third amount of funds associated with the cost of the insurance into a reserve fund from which payment processing service 206 pays insurance claims (or other losses resulting from chargeback requests), as illustrated in block 614.

Based at least in part on determining that a customer is paying for the insurance, server-side transaction handling module 238 may process payment data associated with the transaction for a combined cost, the combined cost corresponding to the cost of the transaction and the cost of the insurance, as illustrated in block 616. That is, server-side transaction handling module 238 may send an authorization request to payment service 210 to authorize the payment data for a combined cost. Responsive to receiving an indication that the payment data is authorized for the combined cost, server-side transaction handling module 238 may send a capture request to payment service 210 for the combined cost. Upon receiving funds totaling the combined cost, server-side transaction handling module 238 may deposit the first amount of funds associated with the total cost of the transaction into a bank account associated with the merchant for payment of the transaction, as illustrated in block 618, and may deposit the third amount of funds associated with the cost of the insurance into a reserve fund from which a payment processing service pays insurance claims (or other losses resulting from chargeback requests), as illustrated in block 620.

It should be noted that process 600 is directed to an example where the payment processing service 206 is providing insurance services (e.g., the offer for insurance is for insurance services provided by the payment processing service 206). In an alternative example, as described above, the offer for insurance may be for insurance services provided by a third-party insurance provider. In such examples, the cost of the insurance may be paid to the third-party insurance provider instead of being deposited into the reserve fund.

The foregoing is merely illustrative of the principles of this disclosure and various modifications may be made by those skilled in the art without departing from the scope of this disclosure. The above described examples are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A system comprising:
one or more processors; and
one or more non-transitory computer-readable media storing instructions executable by the one or more processors, wherein the instructions cause the one or more processors to perform acts comprising:
receiving, from a plurality of point-of-sale (POS) devices of a plurality of merchants, first transaction data associated with a plurality of first transactions, wherein the first transaction data includes, for an individual first transaction of the plurality of first transactions, an indication of (1) whether a chargeback request was associated with the individual first transaction, and (2) an item associated with the individual first transaction and a customer associated with the individual first transaction;
processing, based at least in part on the first transaction data, the plurality of first transactions;
training a predictive model based at least in part on the first transaction data, wherein the predictive model is trained to output a value reflective of a level of risk associated with a transaction;
receiving, from a POS device of a merchant, an indication of an item associated with a second transaction or a customer associated with the second transaction;
determining, based at least in part on inputting to the predictive model at least the item associated with the second transaction or the customer associated with the second transaction, a value reflective of a level of risk associated with the second transaction;
determining, based at least in part on the level of risk associated with the second transaction, to withhold a portion from a settlement amount of the second transaction, at least some of the portion of funds to be remitted to the merchant at a subsequent time; and
causing deposit of the portion in a reserve account to be associated with a payment processing service.

2. The system as claim 1 recites, wherein the chargeback request comprises a first chargeback request, the acts further comprising:
receiving a second chargeback request associated with the second transaction; and
based at least in part on receiving the second chargeback request, satisfying a cost of a chargeback associated with the second chargeback request using the reserve account.

3. The system as claim 1 recites, wherein the portion comprises a first portion, the acts further comprising:
determining a second portion to withhold from the settlement amount of the second transaction, wherein the second portion is associated with a service fee paid to the payment processing service; and
causing the settlement amount, less the first portion and the second portion, to be associated with an account of the merchant.

4. The system as claim 1 recites, the acts further comprising:
based at least in part on the level of risk associated with the second transaction, determining an offer of insurance for the merchant to insure at least the portion of the second transaction against the risk;
sending the offer to the POS device;
receiving an indication of an acceptance of the offer; and
modifying at least one term of settlement of the second transaction based at least in part on the acceptance of the offer.

5. The system as claim 1 recites, wherein training the predictive model is further based at least in part on at least one of, for an individual transaction:
a transaction type, wherein the transaction type comprises a card-not-present transaction or a card-present transaction;
geographic location of the individual transaction;
creditworthiness of a merchant associated with the individual transaction; or
fraud risk associated with the merchant associated with the individual transaction.

6. The system as claim 4 recites, the acts further comprising:

generating, based on the indication that the merchant accepts the offer, an updated value reflective of the level of risk associated with the second transaction.

7. A method comprising:

receiving, by one or more servers of a payment processing service and from a plurality of point-of-sale (POS) devices of a plurality of merchants, first transaction data associated with a plurality of first transactions, wherein the first transaction data includes, for an individual first transaction of the plurality of first transactions, an indication of (1) whether a chargeback request was associated with the individual first transaction, and (2) an item associated with the individual first transaction and a customer associated with the individual first transaction;

processing, by the one or more servers, based at least in part on the first transaction data, the plurality of first transactions;

training, by the one or more servers, a predictive model based at least in part on the first transaction data, wherein the predictive model is trained to output a value reflective of a level of risk associated with a transaction;

receiving, by the one or more servers from a POS device of a merchant, an indication of an item associated with a second transaction or a customer associated with the second transaction;

determining, by the one or more servers and based at least in part on inputting to the predictive model at least the item associated with the second transaction or the customer associated with the second transaction, a value reflective of a level of risk associated with the second transaction;

determining, by the one or more servers and based at least in part on the level of risk associated with the second transaction, to withhold a portion from a settlement amount of the second transaction, at least some of the portion of funds to be remitted to the merchant at a subsequent time; and causing deposit, by the one or more servers, of the portion in a reserve account to be associated with the payment processing service.

8. The method as claim 7 recites, wherein the chargeback request comprises a first chargeback request, further comprising:

receiving, by the one or more servers, a second chargeback request associated with the second transaction; and based at least in part on receiving the second chargeback request, satisfying, by the one or more servers, a cost of a chargeback associated with the second chargeback request using the reserve account.

9. The method as claim 7 recites, wherein the portion comprises a first portion, the method further comprising:

determining, by the one or more servers, a second portion to withhold from the settlement amount of the second transaction, wherein the second portion is associated with a service fee paid to the payment processing service; and causing, by the one or more servers, the settlement amount, less the first portion and the second portion, to be associated with an account of the merchant.

10. The method as claim 7 recites, further comprising:

based at least in part on the level of risk associated with the second transaction, determining, by the one or more servers, an offer of insurance for the merchant to insure at least the portion of the second transaction against the risk;

sending, by the one or more servers, the offer to the POS device;

receiving, by the one or more servers, an indication of an acceptance of the offer; and modifying, by the one or more servers, at least one term of settlement of the second transaction based at least in part on the acceptance of the offer.

11. The method as claim 7 recites, wherein training the predictive model is further based at least in part on at least one of, for an individual transaction:

a transaction type, wherein the transaction type comprises a card-not-present transaction or a card-present transaction;

geographic location of the individual transaction;

creditworthiness of a merchant associated with the individual transaction; or fraud risk associated with the merchant associated with the individual transaction.

12. One or more non-transitory computer-readable media storing instructions executable by one or more processors that, when executed by the one or more processors, cause the one or more processors to perform acts comprising:

receiving, from a plurality of point-of-sale (POS) devices of a plurality of merchants, first transaction data associated with a plurality of first transactions, wherein the first transaction data includes, for an individual first transaction of the plurality of first transactions, an indication of (1) whether a chargeback request was associated with the individual first transaction, and (2) an item associated with the individual first transaction and a customer associated with the individual first transaction;

processing, based at least in part on the first transaction data, the plurality of first transactions;

training a predictive model based at least in part on the first transaction data, wherein the predictive model is trained to output a value reflective of a level of risk associated with a transaction;

receiving, from a POS device of a merchant, an indication of an item associated with a second transaction or a customer associated with the second transaction;

determining, based at least in part on inputting to the predictive model at least the item associated with the second transaction or the customer associated with the second transaction, a value reflective of a level of risk associated with the second transaction;

determining, based at least in part on the level of risk associated with the second transaction, to withhold a portion from a settlement amount of the second transaction, at least some of the portion of funds to be remitted to the merchant at a subsequent time; and causing deposit of the portion in a reserve account to be associated with a payment processing service.

13. The one or more non-transitory computer-readable media as claim 12 recites, wherein the chargeback request comprises a first chargeback request, the acts further comprising:

receiving a second chargeback request associated with the second transaction; and based at least in part on receiving the second chargeback request, satisfying a cost of a chargeback associated with the second chargeback request using the reserve account.

14. The one or more non-transitory computer-readable media as claim 12 recites, wherein the portion comprises a first portion, the acts further comprising:

determining a second portion to withhold from the settlement amount of the second transaction, wherein the second portion is associated with a service fee paid to the payment processing service; and causing the settlement amount, less the first portion and the second portion, to be associated with an account of the merchant.

15. The one or more non-transitory computer-readable media as claim 12 recites, further comprising:

storing the value reflective of a level of risk associated with the second transaction in a merchant profile associated with the merchant.

16. The one or more non-transitory computer-readable media as claim 12 recites, wherein the value reflective of the level of risk is further based at least in part on a predetermined fraud profile associated with a service account of the merchant.

17. The one or more non-transitory computer-readable media as claim 12 recites, wherein the value reflective of the level of risk is further based at least in part on merchant data.

18. The one or more non-transitory computer-readable media as claim 12 recites, wherein the value reflective of the level of risk is associated with a likelihood that the second transaction will be associated with a chargeback for a fraud-related reason.

19. The one or more non-transitory computer-readable media as claim 12 recites, wherein the value reflective of a level of risk associated with the second transaction is based on inputting to the predictive model the item associated with the second transaction.

20. The one or more non-transitory computer-readable media as claim 12 recites, wherein the value reflective of a level of risk associated with the second transaction is based on inputting to the predictive model the customer associated with the second transaction.

* * * * *